United States Patent
Van't Schip

(10) Patent No.: US 11,850,765 B2
(45) Date of Patent: Dec. 26, 2023

(54) CUTTING APPARATUS AND METHOD FOR CUTTING BELTS

(71) Applicant: Flexible Steel Lacing Company, Downers Grove, IL (US)

(72) Inventor: Joannes Stefanus Van't Schip, Ionia, MI (US)

(73) Assignee: Flexible Steel Lacing Company, Downers Grove, IL (US)

( * ) Notice: Subject to any disclaimer, the term of this patent is extended or adjusted under 35 U.S.C. 154(b) by 141 days.

(21) Appl. No.: 17/193,863

(22) Filed: Mar. 5, 2021

(65) Prior Publication Data

US 2021/0276212 A1    Sep. 9, 2021

Related U.S. Application Data

(60) Provisional application No. 62/986,565, filed on Mar. 6, 2020.

(51) Int. Cl.
*B26D 1/08* (2006.01)
*B23Q 1/52* (2006.01)

(52) U.S. Cl.
CPC ............. *B26D 1/085* (2013.01); *B23Q 1/525* (2013.01)

(58) Field of Classification Search
CPC .......... B26D 3/10; B26D 3/003; B26D 1/085; B26D 5/10; B26D 5/16; B26D 5/05; B26D 5/08; B26D 5/20; B26D 1/06; B26D 1/08; B26D 1/065; B26D 1/12; B26D 1/125; B26D 1/255; B26D 1/26; B26D 1/30;
(Continued)

(56) References Cited

U.S. PATENT DOCUMENTS 2,428,742 A * 10/1947 Rothe ............... C14B 9/00
69/17
3,150,561 A * 9/1964 Celli ............... B23Q 35/10
409/118
(Continued)

FOREIGN PATENT DOCUMENTS

DE    202007012172 U1    11/2007
GB       191026995 A     10/1911

OTHER PUBLICATIONS

Forbo Siegling GmbH; Forbo Movement Systems—Punching press for Z-splices PP-ZP-V/80-6 and PP-ZP-V150/6, Data sheet—No. A021, 1, Jul. 2012.
(Continued)

*Primary Examiner* — Evan H MacFarlane
*Assistant Examiner* — Fernando A Ayala
(74) *Attorney, Agent, or Firm* — Fitch, Even, Tabin & Flannery LLP

(57) ABSTRACT

A cutting apparatus for forming fingers in an end of a belt is provided and includes a blade for cutting the belt and a table for positioning the belt below the blade. The cutting apparatus includes an actuator that is connected to the blade via a primary shaft. The actuator is also connected to the table via both a secondary shaft and a cam assembly. Rotation of the actuator causes the primary shaft to continuously reciprocate the blade in upward and downward directions. Rotation of the actuator also causes intermittent movement of the table that includes both translation of the table to index the belt relative to the blade, and pivoting of the table to change an angle of the belt relative to the blade.

17 Claims, 17 Drawing Sheets

(58) Field of Classification Search
CPC ...... B26D 1/305; B26D 2210/06; B26D 5/18; B23Q 1/525; A01D 1/08; B25G 3/38; B25G 1/04; B25G 1/525
USPC .................................. 29/566.1, 566; 83/651
See application file for complete search history.

(56) References Cited

U.S. PATENT DOCUMENTS

| | | | | |
|---|---|---|---|---|
| 3,279,295 A * | 10/1966 | Teplitz | ................... | B23D 17/06 83/601 |
| 4,220,062 A * | 9/1980 | Blanz | ................... | B21D 28/246 83/405 |
| 4,437,371 A * | 3/1984 | Howerton | ................ | B26D 1/02 83/935 |
| 4,746,048 A * | 5/1988 | Kawaguchi | .......... | B23K 3/0615 29/850 |
| 5,020,209 A | 6/1991 | Fullard | | |
| 5,195,412 A * | 3/1993 | Flemming | ................ | B26D 1/60 83/683 |
| 5,243,266 A * | 9/1993 | Kasagami | .............. | B25J 9/1682 700/12 |
| 5,445,305 A | 8/1995 | Hans | | |
| 5,499,565 A * | 3/1996 | Hansen | .................. | B26D 7/025 83/558 |
| 5,857,397 A * | 1/1999 | Matsubayashi | ........... | B26F 1/02 83/558 |
| 6,151,876 A * | 11/2000 | Van Der Burg | ..... | A01G 3/0435 56/1 |
| 7,263,777 B2 * | 9/2007 | Adams | ..................... | G01N 3/46 33/32.6 |
| 8,770,253 B2 | 7/2014 | Zieger | | |
| 9,090,022 B1 | 7/2015 | Van'T Schip | | |
| 9,360,084 B2 | 6/2016 | Zieger | | |
| 9,879,754 B2 | 1/2018 | Van'T Schip | | |
| 2004/0055691 A1* | 3/2004 | Plumley | .................... | B32B 9/02 156/289 |
| 2006/0162512 A1* | 7/2006 | Nasu | ..................... | B26F 1/3826 83/13 |
| 2013/0297064 A1* | 11/2013 | Sherbrooke | ............... | B23C 3/16 409/80 |
| 2015/0352739 A1* | 12/2015 | Armando | ............. | B26D 7/0666 83/267 |
| 2017/0320252 A1* | 11/2017 | Yoshida | ................... | B26D 1/08 |
| 2018/0126504 A1* | 5/2018 | Shelton, IV | ......... | A61B 17/068 |

OTHER PUBLICATIONS

Nitta Corporation of America—Carryflex Tools: FP-120G-60 Finger Puncher, revised Aug. 2, 2012.
Reichenbach Antriebs—und Fördertechnik GmbH—Conveyor belt punching. https://www.reichenbach-gmbh.de/produkte/transportbandstanzen/.
Notification of Transmittal of the International Search Report and Written Opinion of the International Searching Authority issued in corresponding International Application No. PCT/US2021/021076, dated Jun. 15, 2021, 10 pages.
English machine translation and Notification of 1st Rectification issued in corresponding Chinese Utility Model Application No. 202120497853.6, dated Sep. 23, 2021 (3 pages).

* cited by examiner

CUTTING APPARATUS AND METHOD FOR CUTTING BELTS

CROSS-REFERENCE TO RELATED APPLICATION

This application claims the benefit of U.S. Provisional Patent Application No. 62/986,565, filed Mar. 6, 2020, entitled CUTTING APPARATUS AND METHOD FOR CUTTING BELTS, which is hereby incorporated by reference in its entirety.

FIELD

This disclosure relates to cutting of belts, and more particularly, to a cutting apparatus for cutting a belt.

BACKGROUND

Continuous belts may be used in a variety of environments. For example, transmission belts can be used with a roller conveyor to transmit a drive force to overlying rollers for moving packages, for example, from one location to another. Conveyor belts are used to convey material from one position to another.

During installation or repair of continuous belts, it is often necessary to join together the ends of one or more belts. In addition to using mechanical fasteners to splice belt ends together, vulcanized splicing is another known method of joining the ends of conveyor belts, particularly those of polymeric material including light to medium duty polyvinyl chloride (PVC), polyurethane, and polyester belts, to provide a uniform and continuous surface across the belt splice.

Vulcanized splicing typically includes preparing the ends of one or more belts for splicing in a generally overlapping or intermeshing pattern, positioning the prepared belt ends together in a generally end-to-end orientation between a pair of heated plates, and subjecting the belt ends to specific temperatures and pressures applied by one or both of the plates for a specific amount of time to cause the plastic material in the belt ends to melt or soften and flow together. Upon subsequently cooling the belt ends and releasing the pressure therefrom, the plastic will re-harden, fusing the material of the two belt ends to join the belt ends together. One such exemplary belt splicing or welding apparatus is disclosed in Applicant's U.S. Pat. No. 9,090,022.

To prepare belt ends for vulcanized splicing, belts are often cut to form a series of protrusions (or "fingers") and recesses at the end of the belt. Protrusions of a first belt end are then received in the recesses of another belt end such that the two belt ends form an intermeshing pattern prior to vulcanized splicing.

Various tools and methods are used to form fingers in belts ends. For example, known punching presses include levers that are pivoted to drive a blade into a belt disposed on a table. Punching presses often include a V-shaped blade or multiple blades that are arranged to form a V-shape. These blades include corners or recesses which can undesirably capture belt material therein during cutting operations. Such material remains within the corners or recesses during subsequent cutting operations therein. This material often degrades cutting performance, and requires increased maintenance in order to remove the material between cutting operations. Furthermore, in presses that utilize multiple blades to form a V-shape, this material can build up causing the blades to separate over time. This results in an improperly cut finger, as a portion of the finger at the location of the separation is not properly cut from the remainder of the belt.

In one known punching press, provided by Müssel Maschinenbau GmbH, a user must manually shift the support table with one hand to index a belt relative to the cutting head including the cutting blade, and then operate the cutting head lever with their other hand for cutting the fingers in the belt end. This approach is time-consuming, as a user repeatedly pauses the cutting operation in order to shift the table. This approach also necessitates that the user accurately shift the table multiple times to complete the forming of a belt end. Depending on the width of the belt, a user may have to perform eight or more shifts to complete the forming of a belt end. One imprecise shift of the table may result in a faulty cut, such as a cut that overlaps with or is spaced apart from the previous cut. A faulty cut may compel the user to scrap the faulty belt and restart the cutting process with another belt, resulting in wasted time and material.

In another known punching press, provided by Reichenbach Antriebs- and Fördertechnik GmbH, the cutting head is slidably secured to a rail that is adjacent to a relatively long table that receives a belt which can have a relatively wide belt end. Between cutting operations, the table and belt remain stationary while the punching press is guided along the rail relative to the fixed belt. For example, when the blade is raised, a user may rotate a dial of the punching press with one hand to slide the punching press longitudinally over the belt before using their other hand to operate the lever of the cutting head. This approach is also time-consuming, as a user repeatedly pauses the cutting motion in order to shift the cutting head relative to the table. Furthermore, because the table used with this punching press is relatively long, it has a significantly enlarged footprint relative to footprint of the cutting head.

In the punching presses described above, the cutting head includes spaced apart and angularly offset blades. During a first cutting operation, a first blade cuts the belt to form a first side wall of a first finger (which may be an end finger). The belt or cutting assembly is then shifted and the cutting operation is repeated. During a subsequent cutting process, a second blade forms a cut that forms a second side wall of the first finger to complete the cutting of the first finger, while the first blade forms a cut that forms a first side wall of an adjacent finger. The process is repeated as the spaced first and second blades cooperate to form side walls of adjacent fingers. It has been found forming fingers in thicker, polymeric belts by spaced blades can create undesirable dimensional inaccuracies in the cut fingers, which can lead to improper mating between the fingers of belt ends to be spliced and thus lower quality belt splices. It is believed this is due to the multiple cuts of different fingers reducing the rigidity of the belt so that the belt material compresses and shifts more during cutting operations.

SUMMARY

Described herein is a cutting apparatus for forming belt ends. The cutting apparatus includes a table for supporting a belt and a blade for cutting the belt. The cutting apparatus further includes an actuator that is operably coupled to the table and the blade such that actuation of the actuator causes the blade to reciprocate and causes the table to shift relative to the blade.

In one approach, the actuation of the actuator continuously reciprocates the blade and intermittently shifts the table concurrently with reciprocation of the blade. Shifting the table may include, for example, translating and pivoting the table relative to the blade.

The actuator may include a user-actuated lever arm that is operably coupled to the blade for reciprocating the blade, and is operably coupled to the table for shifting the table. The lever arm may shift the table as the lever arm rotates through a first range of rotary movement and may not shift the table as the lever arm rotates through a second range of rotary movement. In one example, rotation of the lever arm in a first angular direction translates the table in a first direction, and rotation of the lever arm in a second angular direction opposite the first angular direction translates the table in a second direction opposite the first direction.

The actuator may be operably connected to a first rotatable shaft for reciprocating the blade and a second rotatable shaft for intermittently translating and pivoting the table relative to the blade. The cutting apparatus may further include a drive wheel rotatably fixed to the first rotatable shaft and a driven wheel rotatably fixed to the second rotatable shaft and intermittently rotated by the drive wheel during actuation of the actuator.

Also described herein is a cutting apparatus for forming fingers of a belt end. The cutting apparatus includes a linear blade for cutting a belt and a belt support opposite the linear blade for supporting the belt. The cutting apparatus further includes a rotatable actuator for driving a drive transmission operably coupled to the linear blade and the belt support. Rotation of the rotatable actuator causes the drive transmission to drive the linear blade to cut the belt to form a first side of a finger, to shift the belt support to reposition the belt relative to the linear blade, and to drive the linear blade to cut the belt to form a second side of the finger.

In one approach, the drive transmission translates and pivots the belt support from a first position for cutting the first side of the finger to a second position for cutting the second side of the finger. The drive transmission shifts the belt relative to the linear blade such that the first and second sides cut by the linear blade form a generally triangular finger. For example, the second side of the finger may extend from the first side of the finger to form an acute angle with the first side.

The rotatable actuator may intermittently shift the belt support along a shift axis, and a cutting edge of the linear blade may extend orthogonal to the shift axis. The linear blade is a single linear blade that cuts the first side of the finger, and cuts the second side of the finger with the belt support shifted relative to the single linear blade.

Also described herein is a cutting apparatus for forming fingers of a belt end. The cutting apparatus includes a table for supporting a belt and a reciprocable blade for cutting the belt to form the fingers. The cutting apparatus further includes an actuator operably coupled to the table to reposition the belt relative to the blade to allow the blade to cut the belt and form edges of the fingers. The actuator may be configured to intermittently translate and pivot the table concurrently with reciprocation of the blade to reposition the belt relative to the blade when the blade is disengaged from the belt.

In one approach, the cutting apparatus further includes a pivotable table support that cooperates with the table for pivoting the table and guiding translation of the table. The pivotable table support is pivotable relative to the blade and is fixed against translation.

The pivotable table support includes a guide channel for receiving a guide member of the table. The guide member is translatable relative to the pivotable table support and is fixed against pivoting within the guide channel such that the guide member and table pivot with the pivotable table support. The guide member includes an elongate rack having teeth that form valleys therebetween. The cutting apparatus further includes a threaded shaft operably coupled to the actuator and meshingly engaged with the teeth such that actuation of the actuator rotates the threaded shaft to translate the guide member. The teeth of the elongate rack may include opposing non-coplanar walls for engaging the threaded shaft during pivoting of the pivotable support table relative to the threaded shaft.

Also described herein is a method of forming fingers of a belt end with a cutting apparatus. The method includes cutting a belt with a blade as the belt is supported on a table to form a first side of a finger by rotation of a rotatable actuator. The method further includes moving the blade away from the table and shifting the table and the belt relative to the blade by rotation of the rotatable actuator. The method further includes cutting the belt with the blade to form a second side of the finger by rotation of the rotatable actuator.

In one approach, shifting the table includes translating and pivoting the belt from a first position for cutting the first side of the finger to a second position for cutting the second side of the finger. Cutting the belt with the table in the first and second positions forms a generally triangular finger. The blade may be a single linear blade that cuts the first and second sides of the finger.

Moving the blade away from the table and shifting the table may occur concurrently by rotation of the rotatable actuator. Rotation of the rotatable actuator may effect continuous reciprocation of the blade and intermittent shifting of the table. Shifting the table may include translating and pivoting the table.

DETAILED DESCRIPTION

Figure 1:
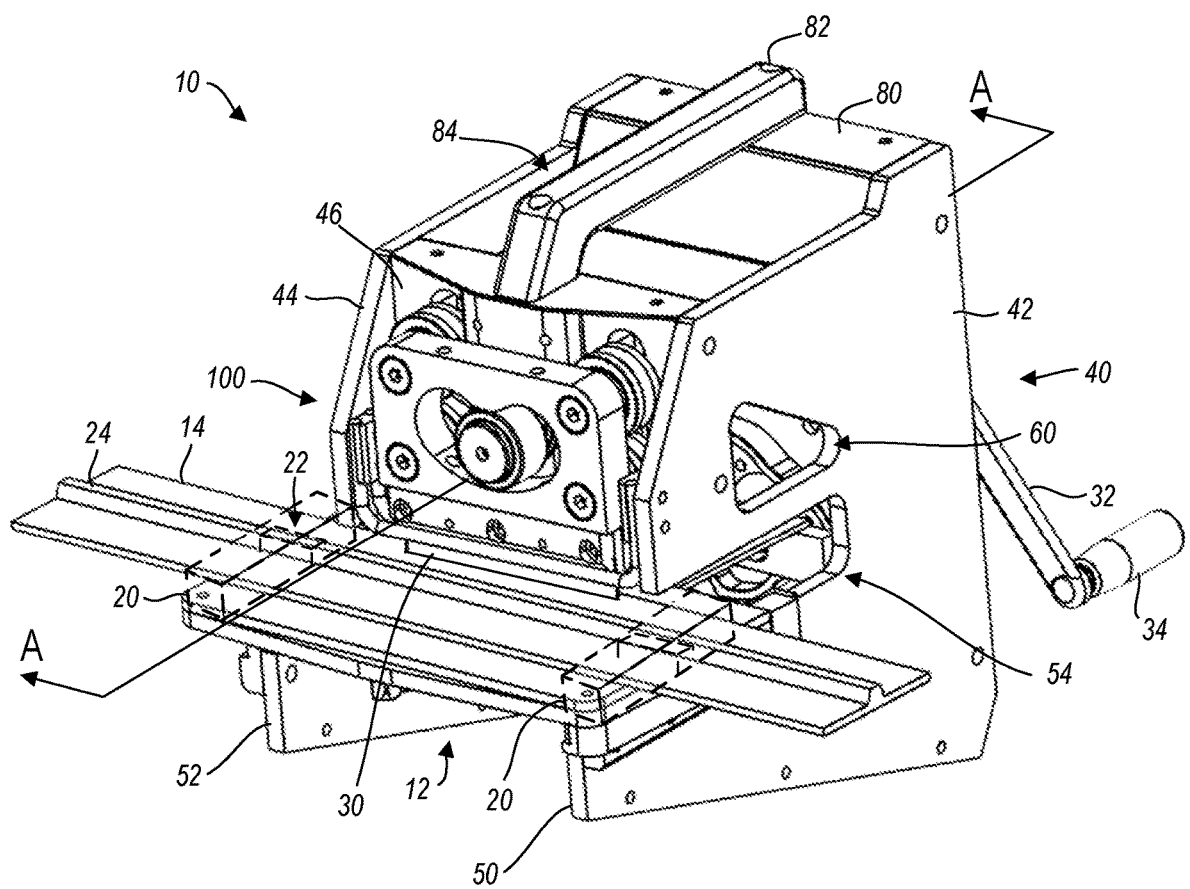
FIG. 1 is an upper perspective view of a belt punch showing a cutting assembly of the belt punch, and a belt secured on a table of the belt punch.
Figure 2:
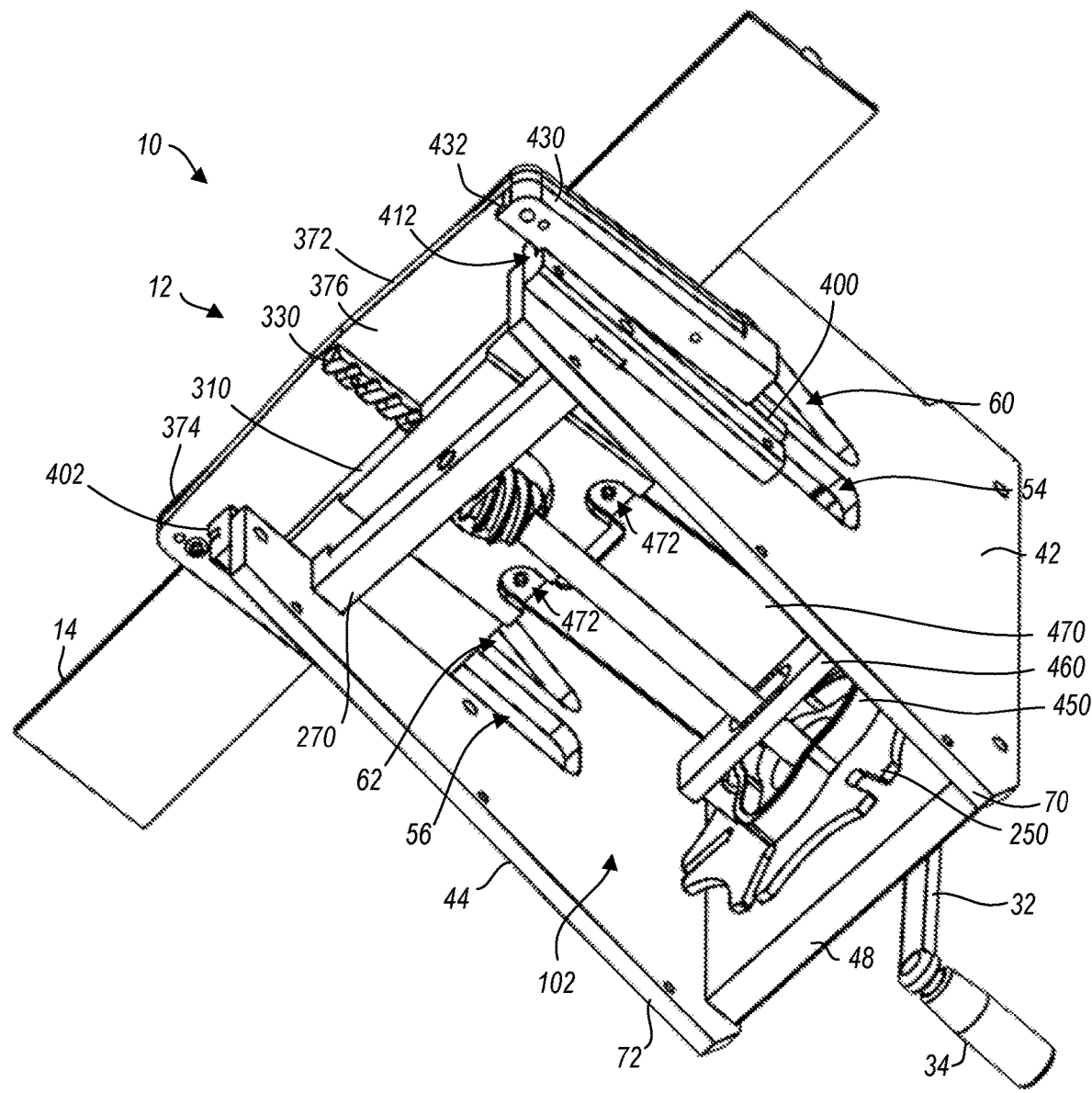
FIG. 2 is a lower perspective view of the belt punch showing a shifting assembly of the belt punch.
Figure 3:
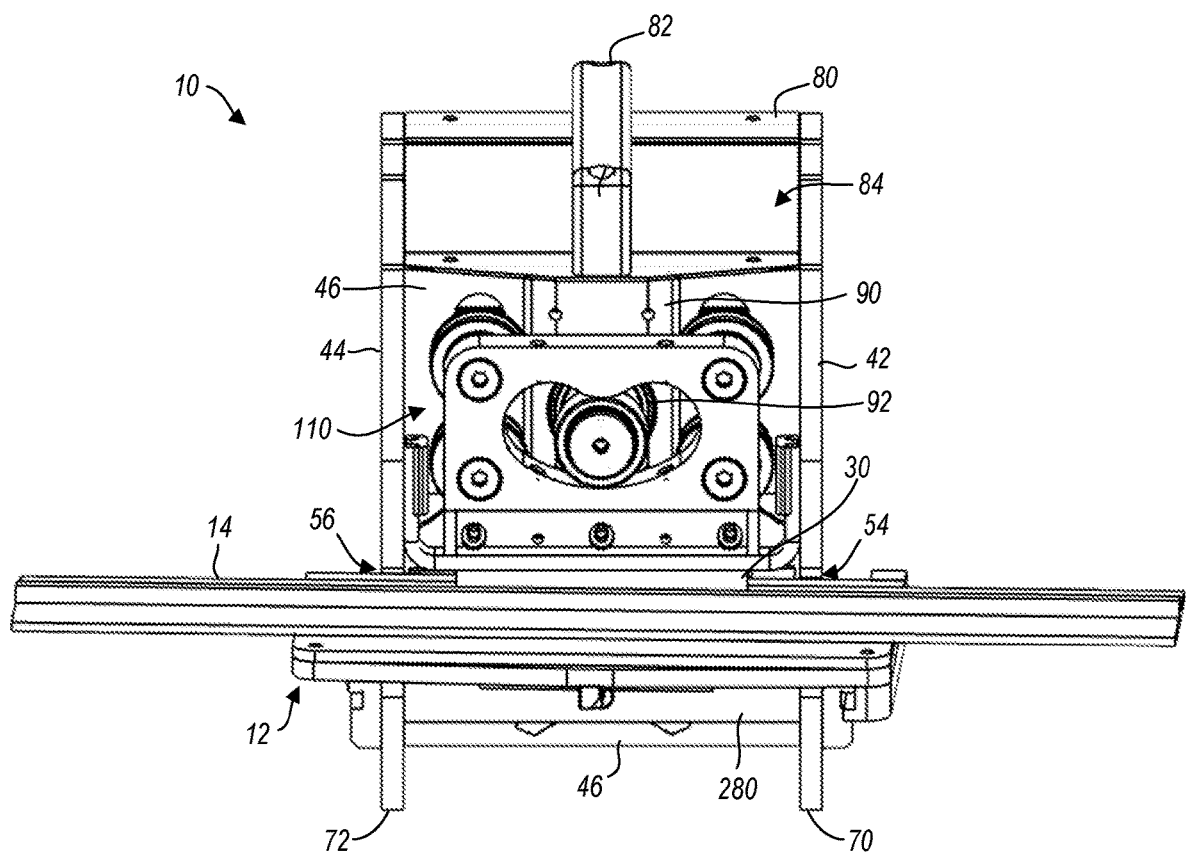
FIG. 3 is a front elevation view of the belt punch showing a cutting blade of the cutting assembly for cutting the belt.
Figure 4:
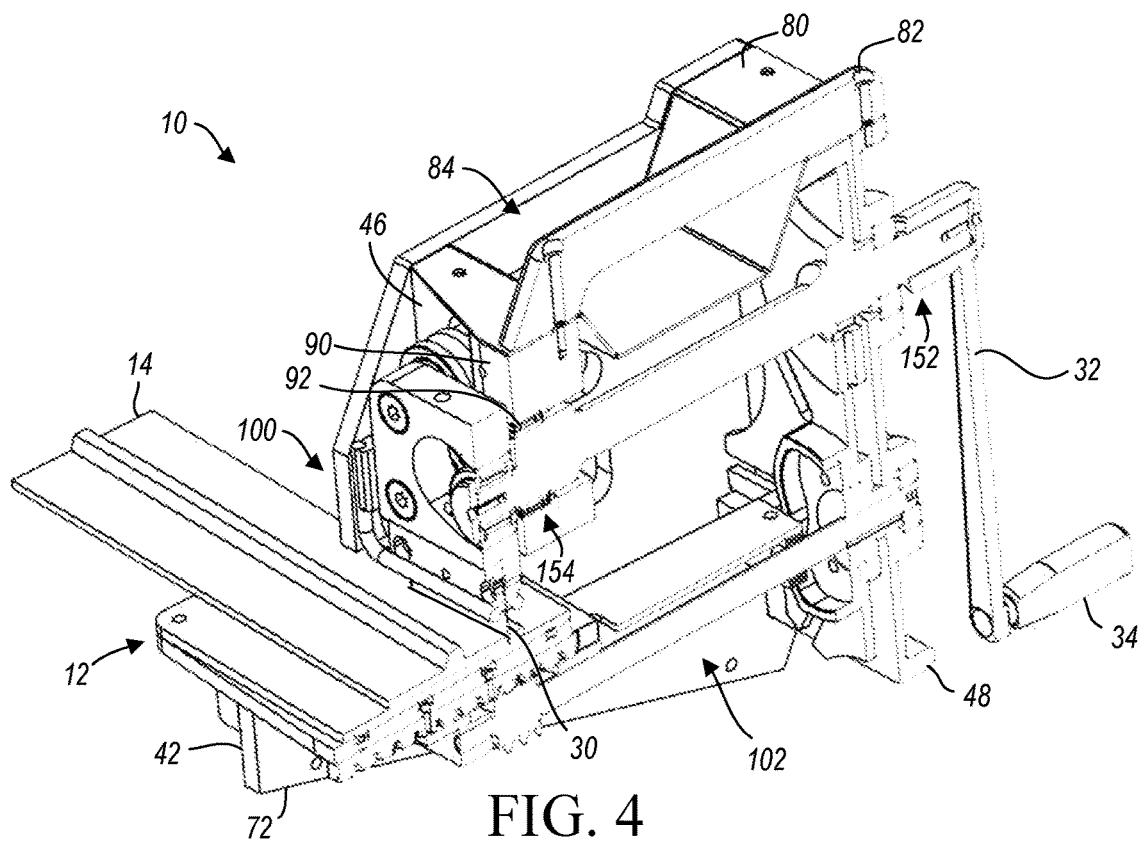
FIG. 4 is a perspective cross-section view along the line A-A of FIG. 1 showing the cutting assembly and the shifting assembly.

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In one form, described herein is a cutting apparatus for forming fingers in an end of a belt. The cutting apparatus includes a single blade for cutting individual sides of fingers to be formed in the belt and a table for positioning the belt below the blade for such finger cutting operations. The cutting apparatus also includes a single, user-operated actuator in the form of a rotary crank that is operatively connected to the blade via a primary shaft of a drive transmission. The crank is also operatively connected to the table via both a secondary shaft and a cam assembly of the drive transmission. Rotation of the crank causes the primary shaft to continuously move the blade in upward and downward directions. Rotation of the same crank also causes intermittent movement of the table. The intermittent movement includes both translation of the table to index the belt relative to the blade, and pivoting of the table to change an angle of the belt relative to the blade. More particularly, rotation of the crank causes the secondary shaft to intermittently translate the table relative to the blade, while concurrently causing the cam assembly to pivot the table relative to the blade.

In this manner, one complete rotation of the crank causes the blade to cut one side of a finger to be formed in the belt end, and the next rotation of the crank causes the blade to cut the other side of the finger to form one finger with a single blade. This allows the cutting apparatus to cut dimensionally accurate fingers on a belt end, via sequentially cutting the individual sides of the fingers in belts, such as polymeric belts, with a single blade. Furthermore, the cutting apparatus is user-friendly since only a single, user-operated actuator needs to be used to both drive the cutting blade and translationally index and pivot the belt relative to the cutting blade so that it is oriented properly for cutting fingers therein.

In one example, the cutting apparatus drive transmission includes an intermittent rotary motion assembly, such as a Geneva mechanism. The Geneva mechanism includes a drive wheel that is connected to the crank to rotate with the crank. The Geneva mechanism also includes a driven wheel that is intermittently driven by the drive wheel for rotation to rotate the secondary shaft and a cam member of the cam assembly. In this way, rotation of the crank continuously reciprocates the blade and intermittently actuates the secondary shaft and the cam member.

With reference to FIGS. 1-5, a cutting apparatus, which may be referred to as a belt punch 10, is shown. The belt punch 10 includes a support, such as table 12, for supporting a belt 14 thereon. The belt 14 may be, for example, a portion of a transmission belt (e.g., a flat belt or V-belt), or a portion of a conveyor belt.

In one approach, one or more belt clamps or hold down bars 20 secure the belt 14 to the table 12 to secure the belt 14 relative to the table 12 during operation of the belt punch 10. During installation of the belt 14 on the table 12, the bars 20 may be loosened or removed to permit the belt 14 to be placed on the table 12. The bars 20 are then secured to the table 12 with the belt 14 therebetween. The bars 20 may include a notched region 22 for receiving a central raised locating portion or ridge 24 of the belt 14.

The belt punch 10 includes a blade 30 and a user-operated actuator in the form of a crank 32 for raising and lowering the blade 30. The blade 30 may be a single blade, and may be in the form of a continuous linear blade, as shown in greater detail in FIG. 7. In this way, the blade 30 does not form corners or recesses. As compared to belt punches that have a V-shaped blade or that have multiple blades that are arranged to form a V-shape or a single blade that is configured to form multiple V-shapes, the continuous linear configuration of the blade 30 avoids the problem of belt material being captured at corners of the blade or blades during a cutting operation which can deform the shape of the corner and create poorly cut fingers.

The crank 32 may include a handle 34 projecting orthogonally from the free end of the crank 32 for assisting in rotation of the crank 32. As the crank 32 is rotated through a first (e.g., generally downward) range of motion, the blade 30 is driven downwardly, causing the blade 30 to cut into the belt 14. As the crank 32 is rotated through a second (e.g., generally upward) range of motion, the blade 30 is raised away from the belt 14. As described in greater detail below, while the blade 30 is in a raised position, rotation of the crank 32 operates to both pivot and translate the table 12 relative to the blade 30. In this way, operation of the single crank 32 cuts the belt 14 with the blade 30 and repositions the belt 14 relative to the blade 30 between cutting motions. Although the belt punch 10 described herein acts to drive the blade 30 downwardly during downward motion of the crank 32 and raises the blade 30 during upward motion of the crank 32, the belt punch 10 may be modified such that the belt punch 10 raises the blade 30 during downward motion of the crank 32, and acts to drive the blade 30 downwardly during upward motion of the crank 32.

Figure 5:
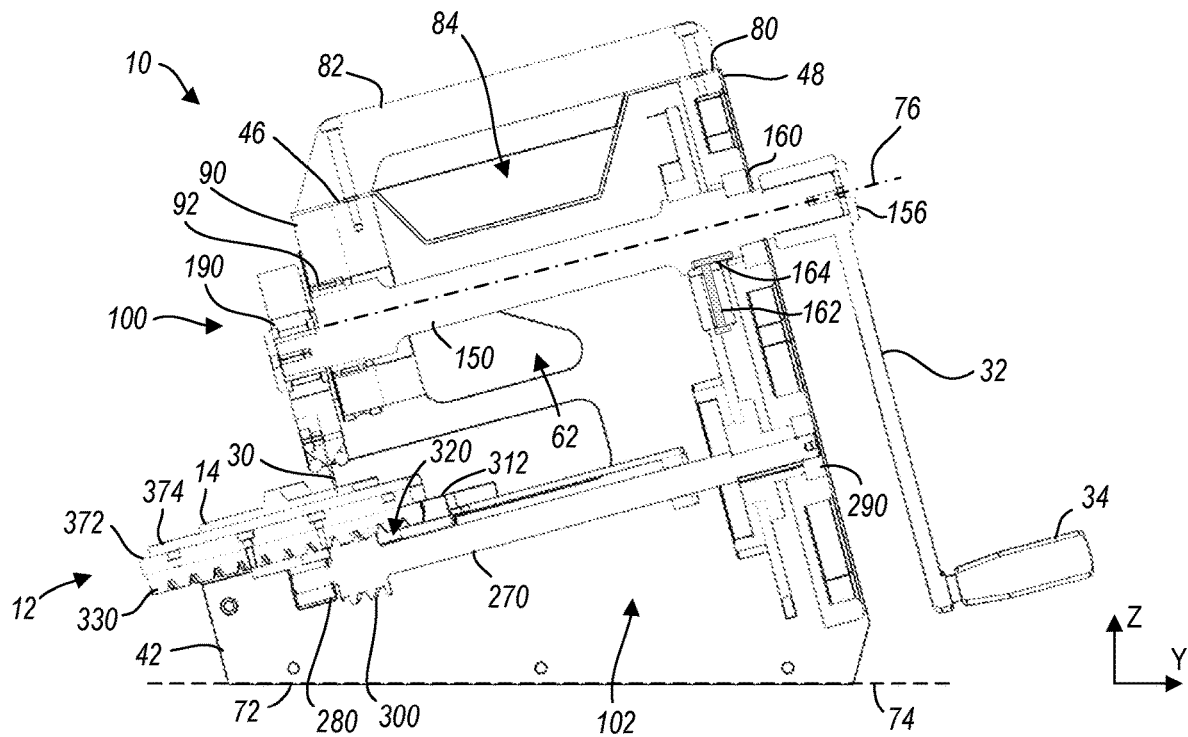
FIG. 5 is a side elevation cross-section view along the line A-A of FIG. 1 showing a forwardly tilted frame of the belt punch that supports the cutting assembly and the shifting assembly in a tilted orientation.

The belt punch 10 includes a frame assembly 40 that supports components of the belt punch 10. The frame assembly 40 may include a first side wall 42 and an opposite second side wall 44. The frame assembly 40 may further include a forward wall 46 and a rear wall 48 that extend between the first and second side walls 42, 44. The first and second side walls 42, 44 include lower arm portions 50, 52 that support the table 12. The first and second side walls 42, 44 further include forwardly opening and rearwardly extending slotted regions 54, 56 for receiving the table 12 as the table 12 is translated forwardly or rearwardly during operation of the crank 32. The first side wall 42 may include a first side opening 60 (FIGS. 1 and 2), and the second side wall 44 may include a second side opening 62 above the respective slotted regions 54, 56 (FIG. 5). The first and second side openings 60, 62 facilitate access to internal components of the belt punch 10, as well as to the belt 14 while the belt 14 is received within the slotted regions 54, 56. For example, in some instances, during installation of the belt 14 while the table 12 is disposed within the slotted region 54, 56, the belt 14 may have a tendency to curl or buckle as the belt 14 is inserted between the table 12 and the clamp bars 20. The first and second side openings 60, 62 permit a user to access and flatten the belt 14 for fitting under the clamp bars 20 to be clamped thereby.

Referring to FIG. 5, the frame assembly 40 may have a tilted configuration. For example, the first side wall 42 includes a first lower surface 70 (shown in FIGS. 2 and 3), and the second side wall 44 includes a second lower surface 72 (shown in FIGS. 2-5). At least a portion of the rear wall 48 (e.g., the portion that receives the crank 32) extends upwardly and forwardly at an oblique angle relative to the bottom surfaces 70, 72 and the generally flat surface 74 on which they are to be placed. The oblique angle may be an acute angle that is in the range, for example, of approximately 45 degrees to approximately 85 degrees, and more particularly, approximately 75 degrees. In this way, the table 12 may be disposed at an oblique angle relative to the surface 74 (e.g., a horizontal support or floor surface) on which the belt punch 10 is disposed. Furthermore, the axis of rotation 76 of the crank 32, is generally parallel to the surface of the table 12 to also extend at an oblique angle to the support surface 74. Such an arrangement permits the crank 32 to have an increased length over that which would be available if the rear wall 48 extended orthogonally to the bottom surfaces 70, 72 to provide an increased moment about the axis of rotation 76 of the crank 32 for an improved mechanical advantage. The low profile front portion of the frame assembly 40 reduces the height to which a belt 14 needs to be raised to be placed on the table 12 of the belt punch 10. Furthermore, the low profile front portion of the frame assembly 40 reduces the weight of the belt punch 10 to improve portability.

The frame assembly 40 may further include an upper or top wall 80 and a handlebar 82 that is attached to the top wall 80. The top wall 80 extends between the first and second sidewalls 42, 44, and may be secured to the frame assembly 40 at the forward and rear walls 46, 48 (e.g., via welding or fasteners). The top wall 80 may include a recessed region 84 that extends downwardly away from the handlebar 82 to accommodate the hand of a user while the user grips the handlebar 82. In this way, the belt punch 10 is portable such that a user may lift and transport the belt punch 10 via the handlebar 82.

A bearing block 90 may be secured to the forward wall 46. The bearing block 90 includes an aperture that receives a bearing 92 therein. As discussed below, the bearing 92 receives a primary shaft 150 to support the primary shaft 150 adjacent its distal end 154 for rotation when the crank 32 is rotated at the proximal end 152 of the primary shaft 150 for generating linear reciprocating motion of the blade 30. As used herein, "proximal" refers to the rearward end, portion, or region that is relatively closer (e.g., along the Y axis of FIG. 5) to a user actuating the crank 32, and "distal" refers to the forward end, portion, or region that is opposite the proximal end, portion, or region and relatively further from the user than the proximal end, portion, or region.

Figure 6:
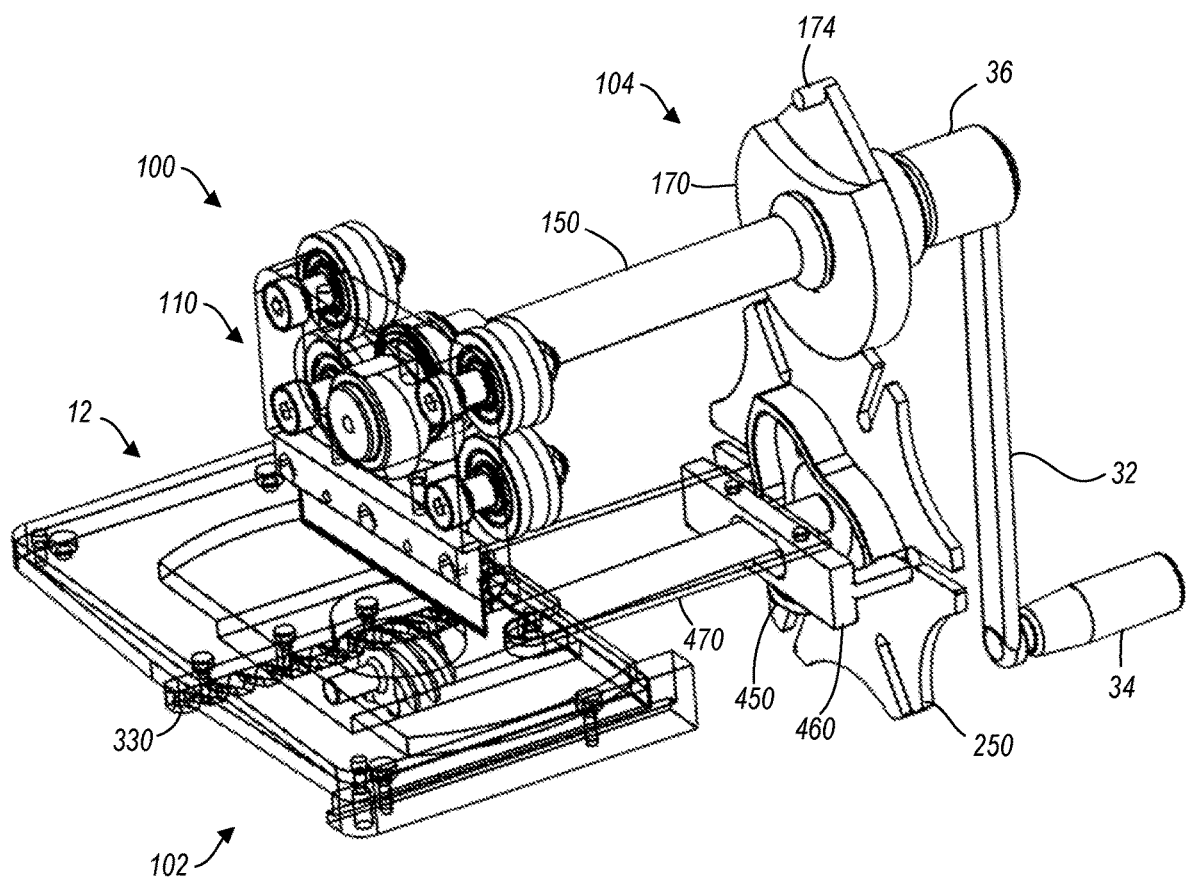
FIG. 6 is a perspective view showing an intermittent rotary motion assembly that connects the cutting assembly and the shifting assembly.

Referring to FIG. 6, the crank 32 and drive transmission are operatively connected to the blade 30 via a cutting assembly 100, and are operatively connected to the table 12 via a shifting assembly 102. The drive transmission and cutting assembly 100 convert rotational movement of the crank 32 into linear reciprocating movement of the blade 30, and the drive transmission and shifting assembly 102 convert rotational movement of the crank 32 into both longitudinal translation and pivoting of the table 12. More particularly, the drive transmission of the belt punch 10 includes an intermittent rotary motion assembly, such as a Geneva mechanism 104. As discussed in greater detail below, the Geneva mechanism 104 includes a drive wheel 170 that is rotated by the crank 32 and a driven wheel 250 that is intermittently rotated by the drive wheel 170 to both longitudinally translate and pivot the table 12.

Figure 7:
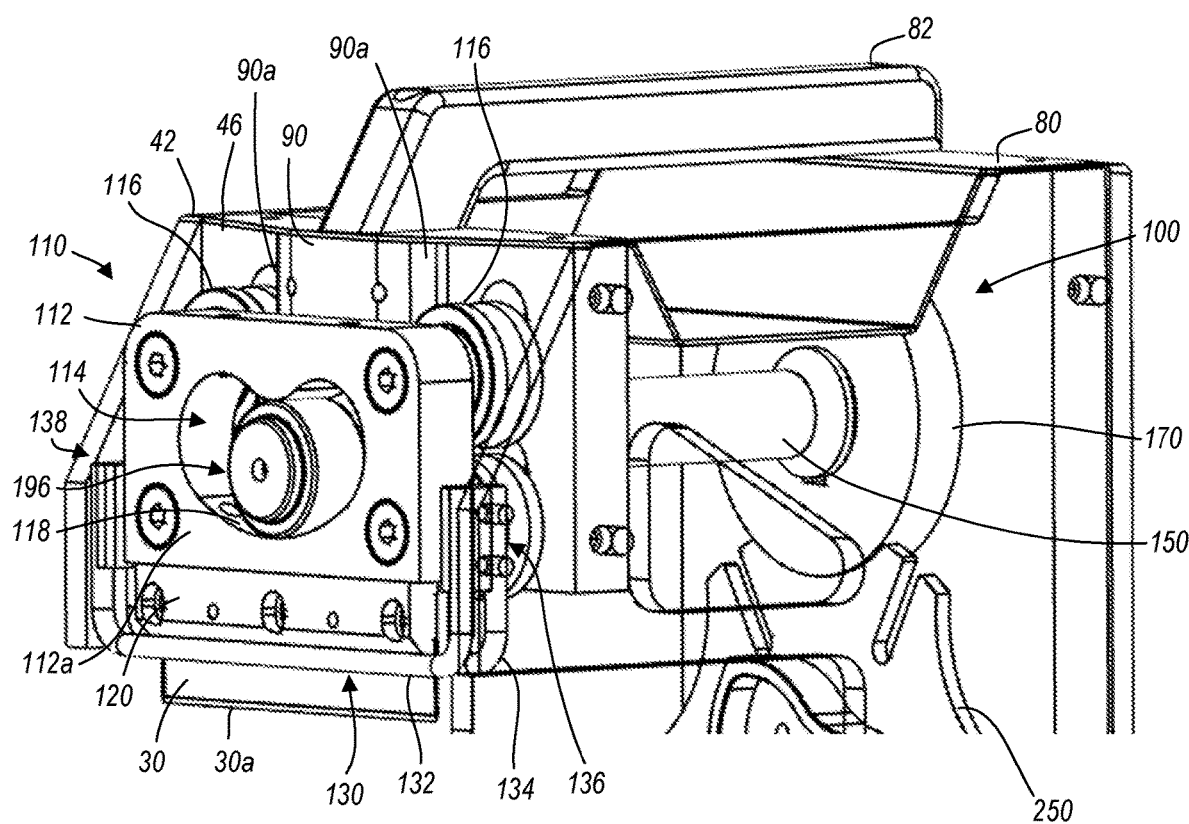
FIG. 7 is a perspective view of a portion of the belt punch showing the cutting assembly with a sidewall shown in partial transparency for clarity.

Referring to FIG. 7, the cutting assembly 100 includes a blade assembly 110 that carries the blade 30. The blade assembly 110 includes a blade holder 112 that has a cam region 114 formed therein. The cam region 114 may be a generally bean-shaped or V-shaped cam opening, having an inner arcuate cam surface 118 extending thereabout in a rectangular block body 112a of the blade holder 112. This configuration of the cam opening causes the motion of the blade 30 to slow down as it moves downwardly requiring more angular rotation of the crank 32 for the same vertical displacement versus when the blade 30 is higher up in its reciprocating movement. This creates a mechanical advantage when the blade 30 is being driven through the belt 14 toward the bottom of its movement.

One or more roller bearings 116 are secured at the rear of the blade holder 112 via fasteners and disposed in rolling engagement with a side surface of the bearing block 90 to guide the generally vertical reciprocating movement of the blade assembly 110. More specifically, the roller bearings 116 can each have a spool configuration with an annular recess for receiving vertically extending guide projections 90a along either side of the bearing block 90. In this way, the roller bearings 116 and the blade holder 112 secured thereto are kept from shifting in forward or rearward directions. The blade assembly 110 further includes a blade clamp member 120 that cooperates with a rearward depending portion of the blade holder 112 at the lower end of the block body 112a to fixedly secure the blade 30 in place between the blade clamp member 120 and the blade holder 112 so that bottom cutting edge 30a of the blade 30 is exposed below the blade holder block body 112a.

The cutting assembly 100 further includes a belt stripping member 130 that releasably secures the blade assembly 110 to the first and second side walls 42, 44. The belt stripping member 130 has a split-construction including a pair of U-shaped tubular portions 132, 134 that are spaced in the fore and aft directions. The spaced portions 132, 134 are disposed on opposite sides of the blade 30 and strip the belt from the blade 30 as it moves upwardly out of the belt as it is common for the belt to stick to the blade 30. The spaced portions 132, 134 transition to upturned end mounting portions 136, 138 of the belt stripping member 130. The end portions 136, 138 are releasably secured to respective first and second side walls 42, 44.

Figure 8:
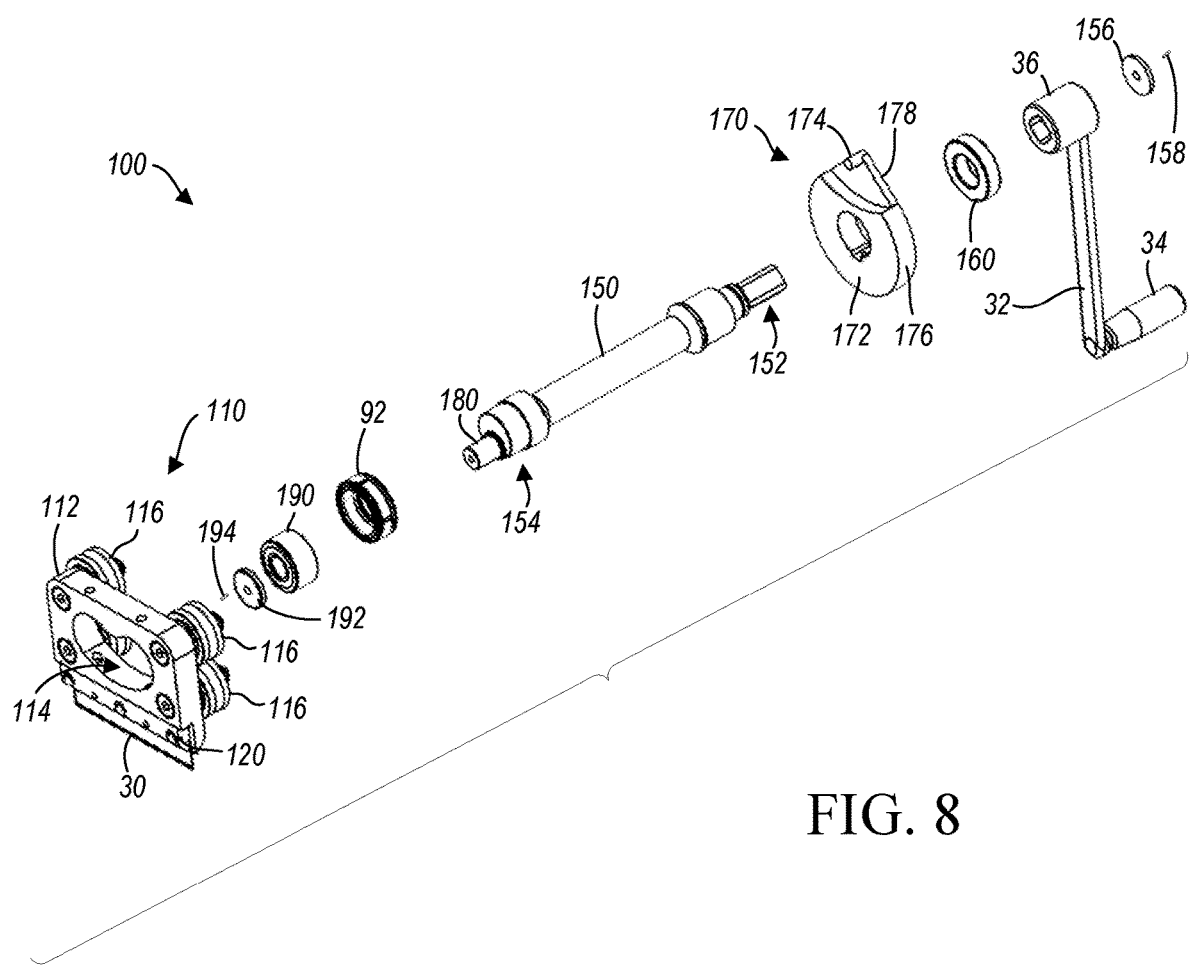
FIG. 8 is an exploded view of the cutting assembly of the belt punch.
Figure 9:
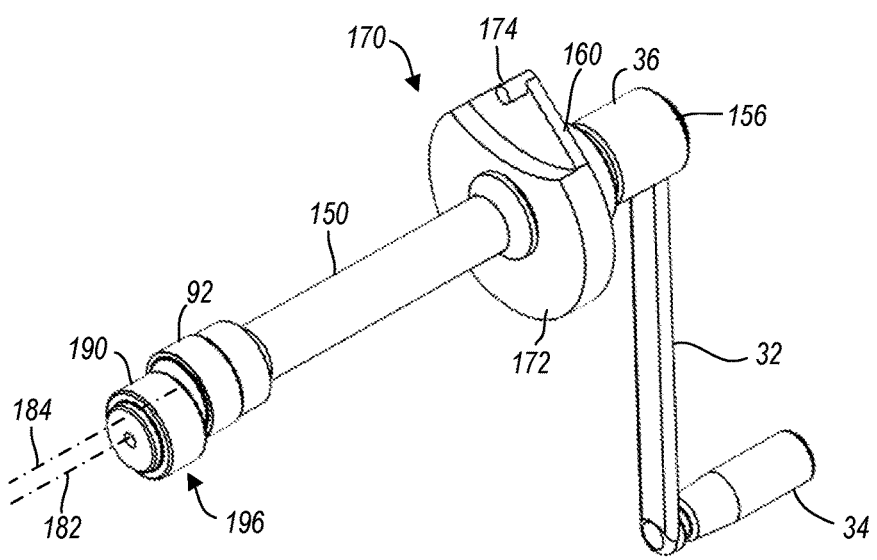
FIG. 9 is a perspective view of the crank and a portion a drive transmission for the cutting assembly showing an eccentric cam drive projection.

Referring now to FIGS. 8 and 9, a proximal end 152 of primary shaft 150 is keyed to the crank 32. For example, the proximal end 152 of the primary shaft 150 may have a generally polygonal cross-section, and the crank 32 may have a base connector portion 36 that has an aperture having a complementary cross-sectional geometry for receiving the polygonal proximal end 152 of the primary shaft 150 therein. In this way, rotation of the crank 32 effects a corresponding rotation of the primary shaft 150. The primary shaft 150 may be axially secured to the base connector portion 36 via a washer 156 and a fastener 158.

The cutting assembly 100 further includes a bearing 160 that is disposed about the primary shaft 150 adjacent the proximal end 152 of the primary shaft 150. As shown in FIG. 5, the bearing 160 is received in an aperture of the rear wall 48 and facilitates rotation of the primary shaft 150 relative to the rear wall 48.

A drive wheel 170 is also disposed about the primary shaft 150 and is keyed to the primary shaft 150 such that rotation of the primary shaft 150 effects a corresponding rotation of the drive wheel 170. For example, as shown in FIG. 5, a key 164 may be disposed in a keyway of the primary shaft 150, and a fastener 162 may extend through the drive wheel 170 and may be fixedly secured to the key 164 to key the drive wheel 170 to the primary shaft 150. In this way, rotation of the crank 32 effects a corresponding rotation of the drive wheel 170. The drive wheel 170 includes a generally annular body portion 172 having an outer arcuate surface 176 and an extension portion 178 (which may be in the form of a generally triangular extension) that includes a roller or pin 174 at an outer periphery thereof. The extension 178 has a plate configuration which is thinner than the thicker annular body portion 172 and is flush with the rear side thereof. The plate extension 178 extends radially beyond a radial dimension of the annular body portion 172 such that the pin 174 is disposed radially outwardly of the outer arcuate surface 176 of the guide body 172.

The drive wheel 170 forms a portion of the drive transmission including an intermittent rotary motion assembly or Geneva mechanism 104. As discussed below, the drive wheel 170 cooperates with a driven wheel 250 of the shifting assembly 102 to cause the table 12 to intermittently pivot and translate relative to the blade 30.

The primary shaft 150 includes an eccentric cam drive projection 180 that extends from the distal end 154 of the primary shaft 150. The eccentric cam drive projection 180 has a central axis 182 that is offset from a central axis 184 of the primary shaft 150, as shown in FIG. 9. In this way, rotation of the primary shaft 150 causes the eccentric cam drive projection 180 to rotate or orbit eccentrically about the central axis 184 of the primary shaft 150.

With reference to FIGS. 7-9, a bearing 190 is disposed about the eccentric cam drive projection 180 and is axially secured to the eccentric cam drive projection 180 portion of the primary shaft 150 via a washer 192 and fastener 194. The eccentric cam drive projection 180 and the bearing 190 cooperate to form a cutter drive portion 196 that is received within the cam region 114 of the blade assembly 110. As the primary shaft 150 is rotated, the cutter drive portion 196 cammingly engages the arcuate inner cam surface 118 to cause the vertical reciprocating motion of the blade assembly 110.

During operation of the belt punch 10, as the crank 32 is rotated in a generally downward direction, the primary shaft 150 rotates the cutter drive portion 196 downwardly such that the central axis 182 of the cutter drive portion 196 is rotated below the central axis 184 of the primary shaft 150. During this rotation, the cutter drive portion 196 is rotated toward a central portion of the cam region 114 and is urged against a lower portion of the inner cam surface 118 of the cam region 114, thereby driving the blade assembly 110 downwardly. Downward motion of the blade assembly 110 causes the blade 30 to be driven downwardly and into a belt 14 that may be disposed on the table 12, forming a cut in the belt 14.

As the crank 32 is rotated in a generally upward direction, the primary shaft 150 rotates the cutter drive portion 196 upwardly such that the central axis 182 of the cutter drive portion 196 is rotated above the central axis 184 of the primary shaft 150. During this rotation, the cutter drive portion 196 is rotated at least partially into a side lobe of the cam region 114 and is urged against an upper portion of the inner cam surface 118, thereby driving the blade assembly 110 upwardly. Upward motion of the blade assembly 110 causes the blade 30 to be driven upwardly and away from a belt 14 that may be disposed on the table 12. As discussed below, as the crank 32 is rotated with the blade 30 spaced upwardly from the table 12, the shifting assembly 102 operates to both pivot and translate the table 12 relative to the blade 30.

Figure 10:
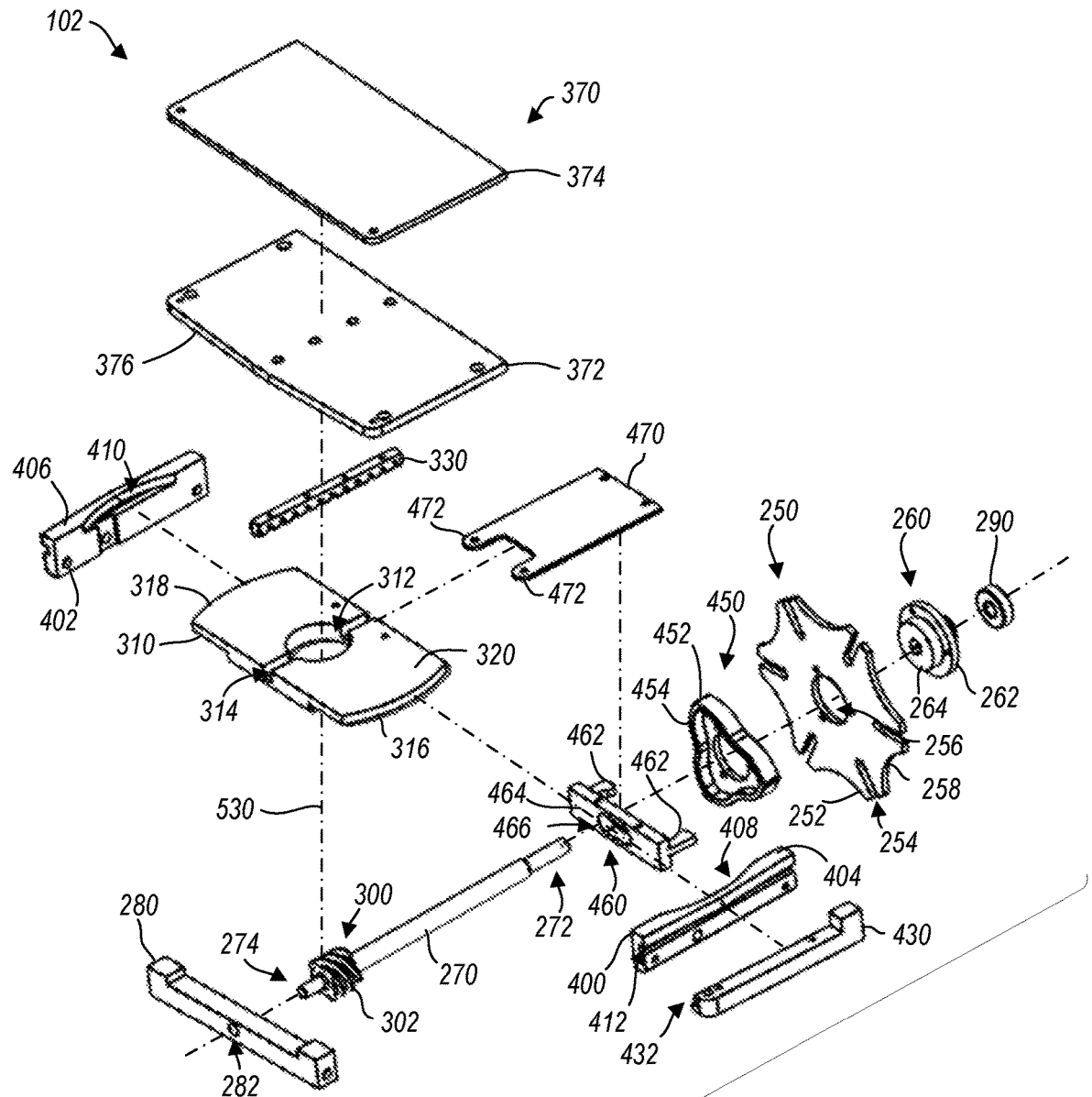
FIG. 10 is an exploded view of the shifting assembly of the belt punch.

Referring to FIG. 10, the shifting assembly 102 includes the driven wheel 250 that cooperates with the drive wheel 170 to form the Geneva mechanism 104. In the approach shown, the Geneva mechanism 104 is a six-position Geneva mechanism, with the driven wheel 250 including six radial spokes or lobes 252 and six slots 254 that are disposed between adjacent lobes 252. Other driven wheel configurations are possible, having various numbers of positions and corresponding numbers of spokes or lobes.

The shifting assembly 102 further includes a hub 260 that is secured to the driven wheel 250 such that rotation of the driven wheel 250 effects a corresponding rotation of the hub 260. The hub 260 includes an annular plate portion 262 that is fixed to the driven wheel 250. The hub 260 further includes a boss portion 264 that extends within a central aperture 256 of the driven wheel 250.

The shifting assembly 102 includes a secondary shaft 270 for linearly translating the table 12. The secondary shaft 270 includes a proximal end 272 and a distal end 274. The distal end 274 is received within an aperture 282 of a support member 280 that extends laterally between and is fixed to the first and second side walls 42, 44 (e.g., at arm portions 50, 52 of the first and second side walls 42, 44), as shown, for example, in FIG. 2. The proximal end 272 of the secondary shaft 270 extends through a central aperture of the hub 260 and is keyed to the hub 260 such that rotation of the hub 260 and driven wheel 250 effects a corresponding rotation of the secondary shaft 270. A bearing 290 is disposed about the secondary shaft 270 at the proximal end 272 of the secondary shaft 270. As shown in FIG. 5, the bearing 290 is fixed in an aperture of the rear wall 48 and facilitates rotation of the secondary shaft 270 relative to the rear wall 48.

The secondary shaft 270 includes a worm drive gear 300 that operably couples the secondary shaft 270 to the table 12. The worm drive gear 300 may include, for example, one or more threads such as a helical thread 302 that extends about the secondary shaft 270.

The shifting assembly 102 further includes a pivotable table support 310 that extends over the secondary shaft 270 and is supported at its outer arcuate edge portions 316 and 318, as discussed further hereinafter, and at its distal end by laterally extending support member 280. The pivotable table support 310 includes a central aperture or opening 312 that extends therethrough, and a fore-and-aft guide channel 314 in its upper surface that intersects the opening 312. The opening 312 is sized to receive a portion of the worm drive gear 300 therein, as shown, for example, in FIG. 5.

Figure 11:
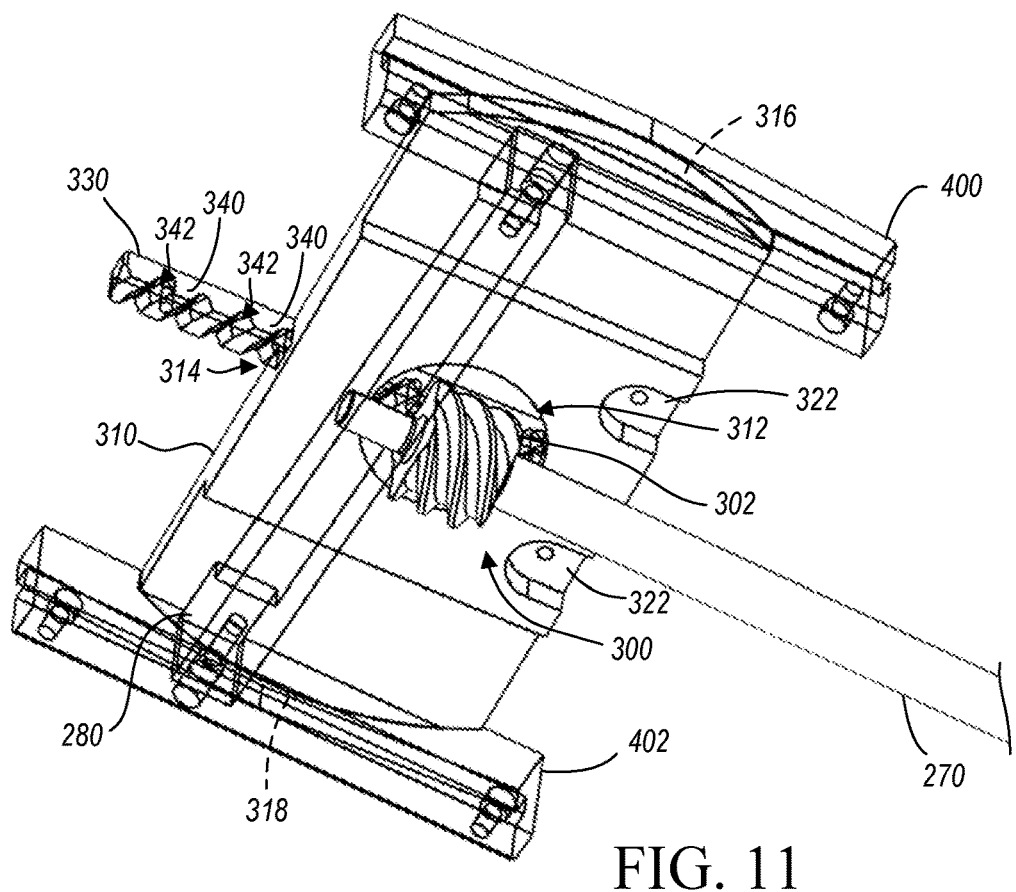
FIG. 11 is a lower perspective view of the shifting assembly showing a worm drive in meshing engagement with a rack.
Figure 12:
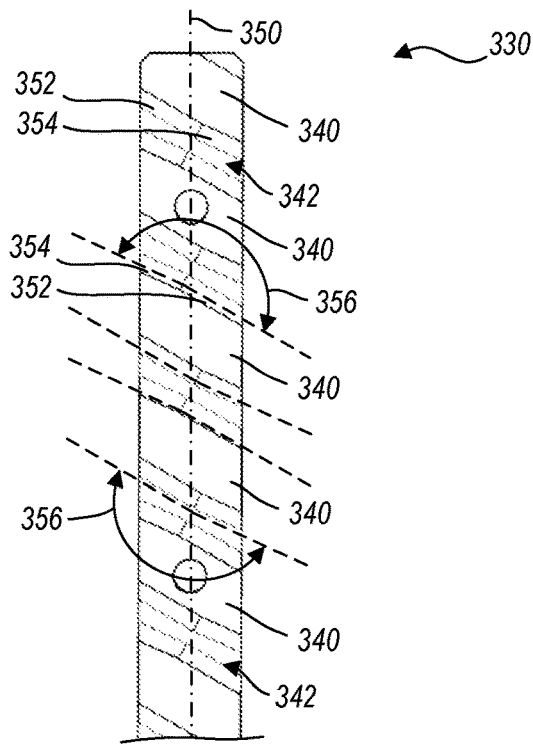
FIG. 12 is a bottom plan view of the rack showing non-coplanar sidewalls of the rack teeth.

Referring to FIGS. 11 and 12, the shifting assembly 102 may include a guide member such as an elongate rack 330. The channel 314 receives the elongate rack 330 such that the elongate rack 330 extends across the aperture 312. The worm drive gear 300 engages the rack 330 to linearly translate the rack 330 as the gear 300 is turned with rotation of the shaft 270 caused by rotation of the crank 32. For example, during a shifting operation of the shifting assembly 102, a range of rotation (e.g., a 60 degree range of rotation) of the worm drive gear 300 may drive the rack 330 approximately 6 millimeters in a linear direction either forwardly or rearwardly depending on the direction of the rotation of the crank 32, thereby shifting the table 12 having the rack 330 fixed thereto approximately 6 millimeters in the corresponding forward or rearward linear direction.

Figure 21:
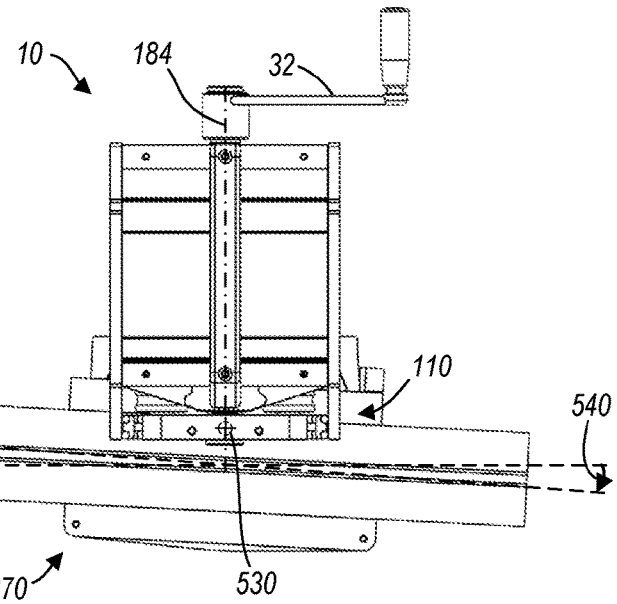
FIG. 21 is a top plan view of the belt punch with the crank in the fourth rotational position showing the table and the belt in a first angular orientation.
Figure 22:
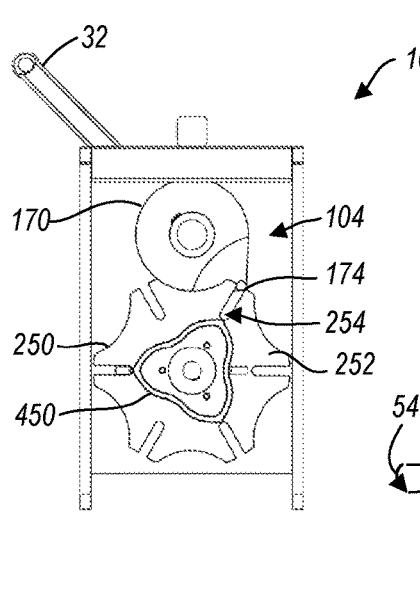
FIG. 22 is a front cross-section view of the belt punch showing the crank in a fifth rotational position.
Figure 23:
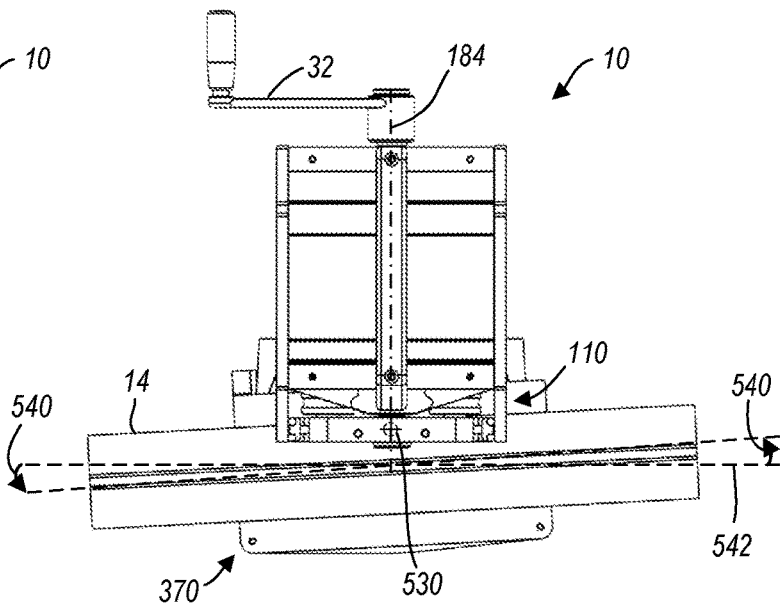
FIG. 23 is a top plan view of the belt punch with the crank in the fifth rotational position showing the table and the belt in a second angular orientation.

As shown in FIG. 12, the rack 330 includes rack teeth 340 that form valleys 342 therebetween. The rack teeth 340 may include non-coplanar walls to facilitate receiving the helical thread 302 of the worm drive gear 300 as the table assembly 310 is pivoted between cutting orientations. For example, a rack tooth 340 may include a first wall segment 352 that extends at a first transverse angle relative to a longitudinal axis 350 of the rack 330, and a second wall segment 354 that extends at a second transverse angle relative to the longitudinal axis 350. The first and second transverse angles may be different such that the first wall segment 352 and the second wall segment 354 are non-coplanar. In this way, the first wall segment 352 and the second wall form an oblique (e.g., obtuse) angle, as indicated at angle 356. In one example approach, the angle 356 may be approximately 186 degrees. The non-coplanar wall segments 352, 354 facilitate linear translation of the rack 330 as it is pivoted between angular cutting orientations. For example, as the rack 330 is pivoted to a first angular orientation by the pivotable table support 310 (which may correspond to the angular orientation of the table assembly 370 shown in FIG. 21), the first wall segments 352 are pivoted into alignment with the helical thread 302 of the worm drive gear 300, and the second parallel wall segments 354 are pivoted out of alignment with the helical thread 302. As the rack 330 is pivoted to a second angular orientation (which may correspond to the angular orientation of the table assembly 370 shown in FIG. 23), the second wall segments 354 are pivoted into alignment with the helical thread 302, and the first wall segments 352 are pivoted out of alignment with the helical thread 302. In this way, the wall segments 352, 354 permit the rack 330 to be linearly translated by the worm drive gear 300 when in the pivoted orientations while avoiding binding of the rack 330 with the worm drive gear 300.

In one approach, the helical thread 302 of the worm drive gear 300 may have a lead angle, for example, of approximately 21 degrees relative to a plane normal to the central axis of the secondary shaft 270. As such, the lead angle of the helical thread 302 is offset approximately 21 degrees relative to the longitudinal axis 350 of the rack 330 when the axes of the secondary shaft 270 and the rack 330 are parallel. The first and second wall segments may be angularly offset from the lead angle of the helical thread 302 to account for pivoting of the pivotable table support 310. For example, the first wall segments 352 may extend approximately 24 degrees relative to a plane normal to the longitudinal axis 350 such that the first wall segments 352 are maintained in engagement with the helical thread 302 when the rack 330 is pivoted to the first pivot orientation (e.g., FIG. 21) by the pivotable table support 310. The second wall segments 354 may extend approximately 18 degrees relative to a plane normal to the longitudinal axis 350 such that the second wall segments 354 are maintained in engagement with the helical thread 302 when the rack 330 is pivoted to the second pivot orientation (e.g., FIG. 23) by the pivotable table support 310. In this way, the wall segments 352, 354 are selectively maintained in engagement with the helical thread 302 of the worm drive gear 300 during pivoting and linear translation of the rack 330.

Figure 13:
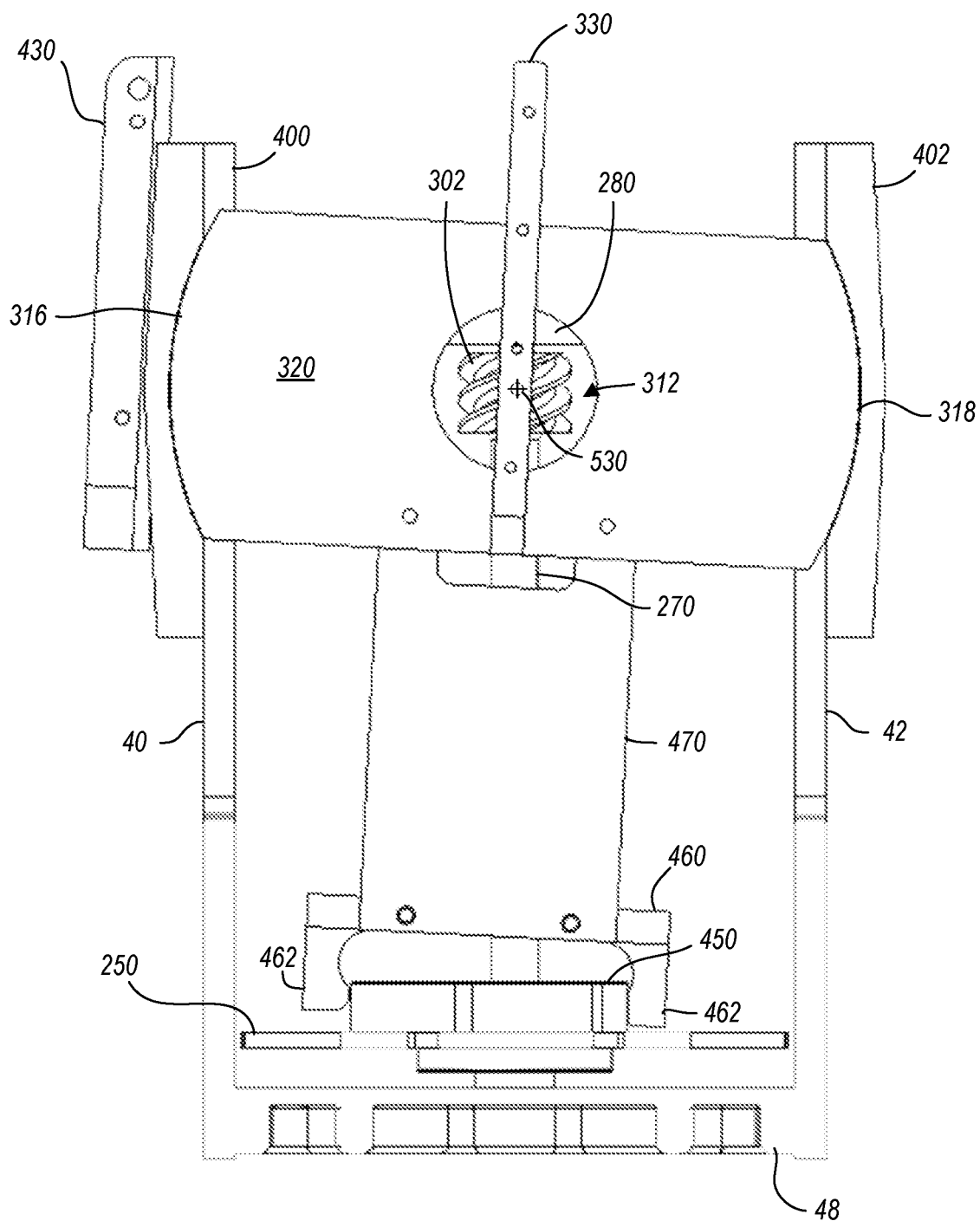
FIG. 13 is a top plan view of the shifting assembly showing the pivotable belt supporting table assembly.

With reference to FIGS. 10, 11, and 13, the pivotable table support 310 further includes the opposite curved side edges 316, 318 that facilitate pivoting of the pivotable table support 310, a planar upper surface 320 that supports the table 12, and notches or recess 322 in its lower surface at the rear thereof for receiving forward attachment extensions 472 of connector or pivot arm 470, as discussed further below.

Referring to FIG. 10, in one approach, the table 12 is a table assembly 370 that includes multiple table components. For example, the table assembly 370 may include a pad support member 372 such as of a steel material that may be overlaid on the planar upper surface 320 of the pivotable table support 310. The rack 330 is fixedly secured to the pad support member 372 to extend centrally along the bottom surface 376 thereof such that linear translation of the rack 330 within the channel 314 of the pivotable table support 310 effects a corresponding linear translation of the pad support member 372. In this way, linear translation of the rack 330 (e.g., as driven by the worm drive gear 300) effects a corresponding linear translation of the table assembly 370, and pivoting of the rack 330 due to pivoting of the pivotable table support 310 with a portion of the rack 330 extending in the channel 314 effects a corresponding pivot motion of the table assembly 370.

The table assembly 370 may further include a punch pad 374, which may be overlaid on, and fixedly secured to, the pad support member 372. The punch pad 374 may be of a pliable material such as nylon so that it does not damage or cause undue blade wear when the blade 30 is driven downwardly through the belt 14.

The shifting assembly 102 further includes pivot and translation guides 400, 402 that are secured to the first and second side walls 42, 44. The pivot and translation guides 400, 402 include upper support surfaces 404, 406 for supporting outer edge portions of the pad support member 372. The pivot and translation guides 400, 402 further include inner arcuate recessed regions 408, 410 having planar support shoulder surfaces for supporting the pivotable table support 310 and curved sidewalls for guiding the curved outer portions 316, 318 of the pivotable table support 310 during pivoting thereof, as shown in FIG. 11. The curved sidewalls of the inner arcuate recessed regions 408, 410 and the curved outer edge portions 316, 318 of the table support 310 may each have a radius of curvature that is centered about a pivot axis 530 of the table assembly 370.

The table assembly 370 includes at least one table translation member 430 that is fixedly secured thereto; for example, to one or both of the pad support member 372 and the punch pad 374 at the outer edges thereof. The table translation member 430 maintains the table assembly 370 in downward engagement with the pivotable table support 310 as the table assembly 370 is translated relative to the frame assembly 40 by the rack 330. In one example, the table translation member 430 includes a laterally inwardly extending ridge 432 that extends within a linearly extending and laterally outwardly facing recess 412 of the pivot and translation guide 400, as shown, for example, in FIGS. 2 and 10, such that translation of the table translation member 430 is guided by the pivot and translation guide 400. The recess 412 is sized such that the ridge 432 can both be translated through the recess 412 and pivoted relative to the recess 432 while maintaining translational guidance by the recess 432. In this way, portions of the inner-facing surface of the ridge 432 may be spaced away from the outer-facing surface of the recess 412 depending on the pivotal orientation of the table assembly 370. In another example, the table translation member 430 could instead include a recess that receives a protruding ridge of the pivot and translation guide 400.

In this way, the pivot and translation guide 400 supports the pivotable table support 310 in a vertical direction, guides pivotable movement of the pivotable table support 310 in a forwardly inclined plane, and further guides translation of the of table assembly 370 in linear forward and rearward directions along the forwardly inclined plane.

As discussed, rotation of the crank 32 effects intermittent linear translation of the table assembly 370. More particularly, a rotational force of the crank 32 drives the drive wheel 170 such that the pin 174 of the drive wheel 170 is rotated into engagement with the driven wheel 250 to rotate the driven wheel 250. Rotation of the driven wheel 250 transfers a rotational force through the hub 260 to the secondary shaft 270, which is keyed to the hub 260. The helical thread 302 of the worm drive gear 300 drives the rack teeth 340 of the rack 330 to linearly translate the rack 330 and the table assembly 370 that is fixed to the rack 330.

When the pin 174 is not received in a slot 254 of the driven wheel 250, the drive wheel 170 is operable to block rotation of the driven wheel 250. More particularly, the outer arcuate surface 176 of the annular portion 172 of the drive wheel 170 mates with and rotates along an outer concave, arcuate surface portion 258 of a lobe 252 of the driven wheel 250 to keep the drive wheel 250 from rotating therewith.

The shifting assembly 102 further includes pivotable components for pivoting the pivotable table support 310, which thereby pivots the table assembly 370 and a belt 14 supported on the table assembly 370 due to the close fit of the rack 330 of the pad plate member 372 in the channel 314 of the table support 310. Generally, the shifting assembly 102 includes a cam assembly including a cam member 450 that is secured to the driven wheel 250, and a cam follower 460 that follows the cam member 450. A connecting member or pivot arm 470 that is secured to both the cam follower 460 and the pivotable table support 310 is operable so that as the cam follower 460 is cammed by the rotation of the cam member 450, the pivot arm 470 also shifts for pivoting of the pivotable table support 310.

More particularly, the cam member 450 is fixedly secured to the driven wheel 250 such that rotation of the driven wheel 250 effects a corresponding rotation of the cam member 450. The cam member 450 includes a central aperture that receives the secondary shaft 270 therethrough, and further includes a plurality of cam lobes 452 disposed about the central aperture. In the example shown, the cam member 450 includes three cam lobes 452.

The cam follower 460 has a laterally extending rectangular block body 464 having a laterally extending slot 466 that receives the secondary shaft 270 extending therethrough. The cam follower 460 also includes cam follower arms 462 that extend away from the cam follower body 464 at either end thereof and toward the driven wheel 250. The cam follower arms 462 are spaced apart and extend rearwardly such that they receive the cam member 450 therebetween, as shown in FIG. 13. As the cam member 450 is rotated by the driven wheel 250, the arcuate walls 454 of the cam lobes 452 in engagement with the cam follower arms 462 shift the cam follower arms 462 laterally. As can be seen in FIG. 6, when one of the arms 462 is at a peak of one of the cam lobes 452, the opposite arm 462 is in a recess or valley between cam lobes 452 diametrically opposite the cam lobe peak that is engaged with the other arm 462. This lateral movement of the cam follower arms 462 and thus of the cam follower 460 causes the connecting pivot arm 470 rigidly connected to both the cam follower 460 and the pivotable table support 310 to shift. However, because the table support 310 is restricted to pivoting about pivot axis 530 by the sliding engagement between its curved outer edges 316, 318 at the corresponding curved side walls of the recessed regions 408, 410 of the pivot and translation guides 400, 402, the connecting pivot arm 470 also pivots causing the cam follower 460 to rock or pivot so that the cam follower arm 462 engaged at the peak of one of the cam lobes 452 is shifted forwardly while the opposite cam follower arm 462 engaged in the valley between the other cam lobes 452 is shifted rearwardly, as can be seen in FIG. 13.

More specifically, the pivot arm 470 is secured at its proximal end to the cam follower 460 and at its distal end to the pivotable table support 310 to rigidly connect the cam follower 460 to the pivotable table support 310. The pivot arm 470 may be in the form of a plate that includes the forward attachment extensions 472 that extend into, and are fixedly secured in the lower recesses 322 (FIG. 11) of the pivotable table support 310, as shown, for example, in FIG. 2. The pivot arm 470 is secured to the cam follower 460 such that shifting of the cam follower 460 effects a corresponding shifting of the pivot arm 470, as discussed above.

Figure 14:
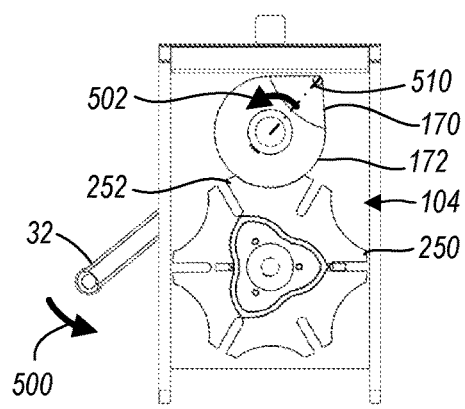
FIG. 14 is a front cross-section view of the belt punch showing the crank in a first rotational position.
Figure 15:
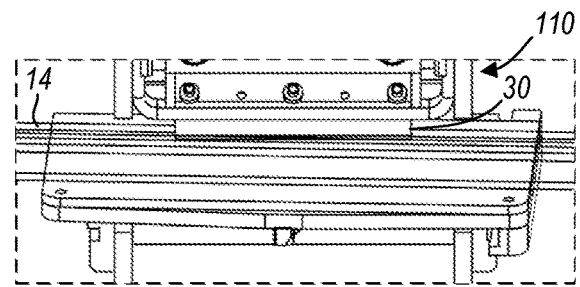
FIG. 15 is a front elevation view of the belt punch showing the cutting assembly with the blade in a raised position when the crank is in the first rotational position of FIG. 14.

Referring to FIGS. 14-25, a method of forming a belt end for a vulcanized splice includes rotating the crank 32 to both cut a belt 14 (FIGS. 14-19) to form fingers 560, 562 in the belt 14 (FIGS. 24 and 25) and angularly shift or pivot the belt 14 relative to a blade 30 (FIGS. 20-23). As shown in FIG. 14, the crank 32 may be rotated, as indicated by arrow 500, through a cutting motion such that the drive wheel 170 rotates, as indicated by arrow 502, relative to the driven wheel 250. During the cutting motion, the outer arcuate surface 176 of the annular portion 172 of the drive wheel 170 mates with and rotates along the outer arcuate surface portion 258 of a lobe 252 of the driven wheel 250 to keep the drive wheel 250 from rotating therewith. In the first angular orientation 510 of the crank 32 shown in FIG. 14, the blade 30 is spaced from the belt 14, as shown in FIG. 15.

Figure 16:
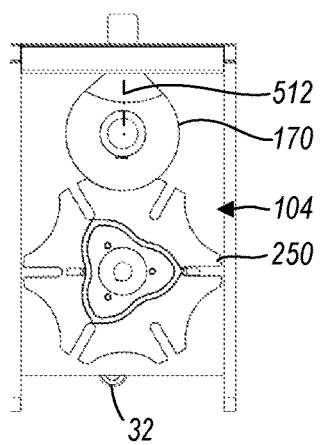
FIG. 16 is a front cross-section view of the belt punch showing the crank in a second rotational position.
Figure 17:
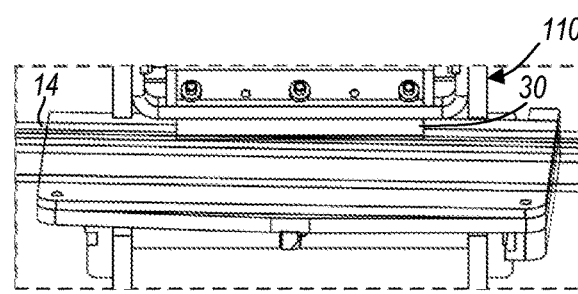
FIG. 17 is a front elevation view of the belt punch showing the cutting assembly with the blade in a lowered, cutting position when the crank is in the second rotational position of FIG. 16.
Figure 18:
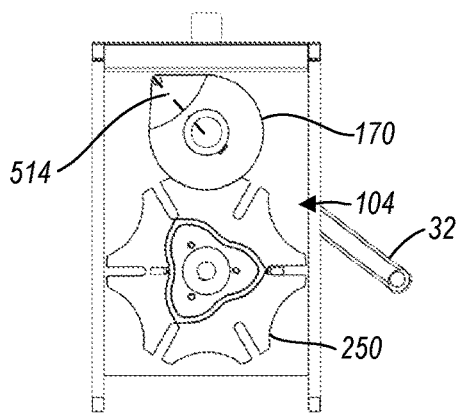
FIG. 18 is a front cross-section view of the belt punch showing the crank in a third rotational position.
Figure 19:
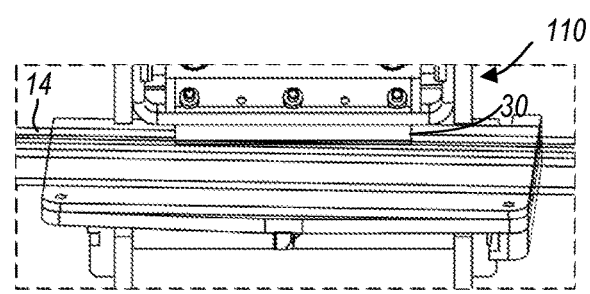
FIG. 19 is a front elevation view of the belt punch showing the cutting assembly with the blade in a raised position when the crank is in the third rotational position of FIG. 18.
Figure 20:
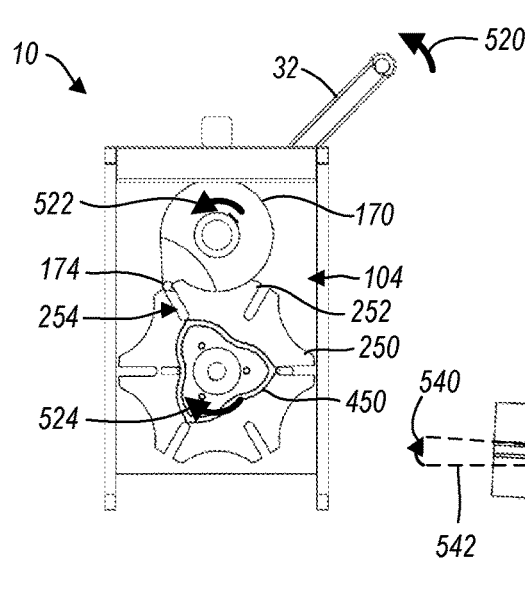
FIG. 20 is a front cross-section view of the belt punch showing the crank in a fourth rotational position.

Continued rotation of the crank 32 (e.g., in the counterclockwise direction) moves the drive wheel 170 to the second angular orientation 512 to an almost dead-center down position shown in FIG. 16, and drives blade 30 into the belt 14, as shown in FIG. 17, thereby forming a cut in the belt 14. As discussed above, the mechanical advantage provided by the configuration of the cam opening allows blade 30 to be driven with a downward force of approximately 40 N/mm, so that at a blade length of 125 mm the total force is approximately 5 kN. The crank 32 may be further rotated to the third angular orientation 514 shown in FIG. 16, wherein the blade 30 is raised out of engagement with the belt 14, as shown in FIG. 19. In the third angular orientation 514, the crank 32 is rotated approximately 60 degrees from the crank orientation shown in FIG. 14.

Referring to FIGS. 20-23, rotation of the crank 32 intermittently causes the table assembly 370, and the belt 14 disposed on the table assembly 370, to pivot relative to the cutting assembly 110. More particularly, referring to FIGS. 20 and 21, rotation of the crank 32, as indicated by arrow 520, rotates the drive wheel 170 of the Geneva mechanism 104, as indicated by arrow 522, such that the pin 174 of the drive wheel 170 is rotated into a slot 254 of the driven wheel 250. Continued rotation of the crank 32 drives the pin 174 against a spoke or lobe 252 of the driven wheel 250 and drives rotation of the driven wheel 250, as indicated by arrow 524.

As discussed, rotation of the driven wheel 250 causes the table assembly 370 to be pivoted via the cam member 450, the cam follower 460, and the pivot arm 470. The table assembly 370 is pivoted about the pivot axis 530, which may be disposed at a center of the blade holder 112 of the blade assembly 110. The center of the blade holder 112 may be disposed over the aperture 312 of the pivotable table support 310 such that the pivot axis 530 of the table assembly 370 extends through the aperture 312 (e.g., at a center of the aperture 312) and intersects the worm drive gear 300, as shown in FIG. 13.

In one approach, pivoting of the pivotable table support 310 pivots the table assembly 370, as indicated at arrow 540, approximately three degrees in clockwise and counterclockwise directions from an axis 542 that is orthogonal to the central axis 184 of the primary shaft 150. In this way, the crank 32 pivots the pivotable table support 310, via the shifting assembly 102, approximately six degrees from the table angle shown in FIG. 21 to the table angle shown in FIG. 23 for cutting opposite sides of a finger. Other degrees of pivoting of the pivotable table support 310 are expressly contemplated depending on the configuration and size of the fingers that are desired.

It is to be appreciated that the concurrent pivoting and linear translation of the pivotable table support 310 occurs during rotation of the driven wheel 250. As such, the number of lobes 252 of the driven wheel 250 may dictate the degree of rotation of the crank 32 necessary to rotate the driven wheel 250 from one stop to the next stop. In the approach shown, the driven wheel 250 is a six-stop driven wheel. As such, the crank 32 rotates 60 degrees from the position shown in FIG. 20 to the position shown in FIG. 22 to rotate the driven wheel 250 60 degrees from the stop position shown in FIG. 20 to the stop position shown in FIG. 22. It is during this rotation of the driven wheel 250 that the driven wheel 250 effects the pivoting and linear translation of the pivotable table support 310.

In another approach, the belt punch may be configured to pivot the blade relative to the table, and linearly translate the blade relative to the table, while the table is maintained in place. In this approach, the blade may be configured for vertical movement to cut a belt, pivotable movement to adjust an angle of the belt cut, and linear movement to adjust a linear location of the belt cut. In yet another approach, the belt punch may be configured to linearly translate the blade and to pivot the table. In still another approach, the belt punch may be configured to pivot the blade and to linearly translate the table.

Referring to FIGS. 24-28, another cutting apparatus, which may be referred to as a belt punch 10', is shown. Belt punch 10' may be similar in many regards to the belt punch 10 discussed with respect to FIGS. 1-23. As such, like reference numerals are used to refer to like components.

Figure 24:
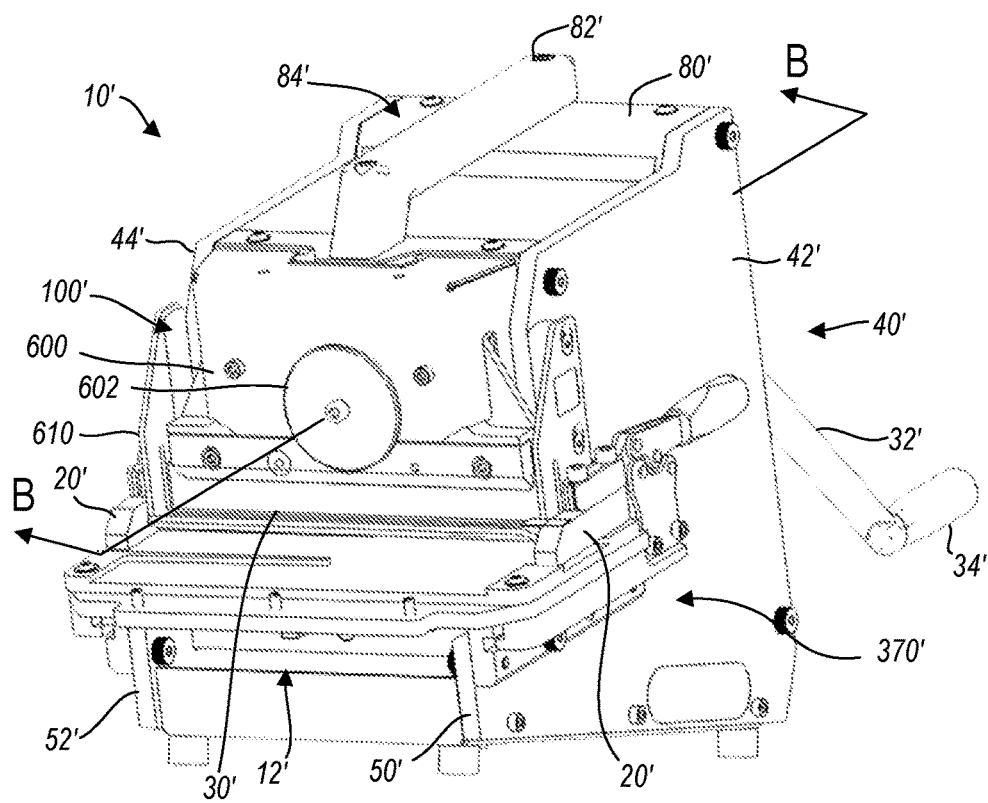
FIG. 24 is a front perspective view of another belt punch showing a cutting assembly of the belt punch.
Figure 25:
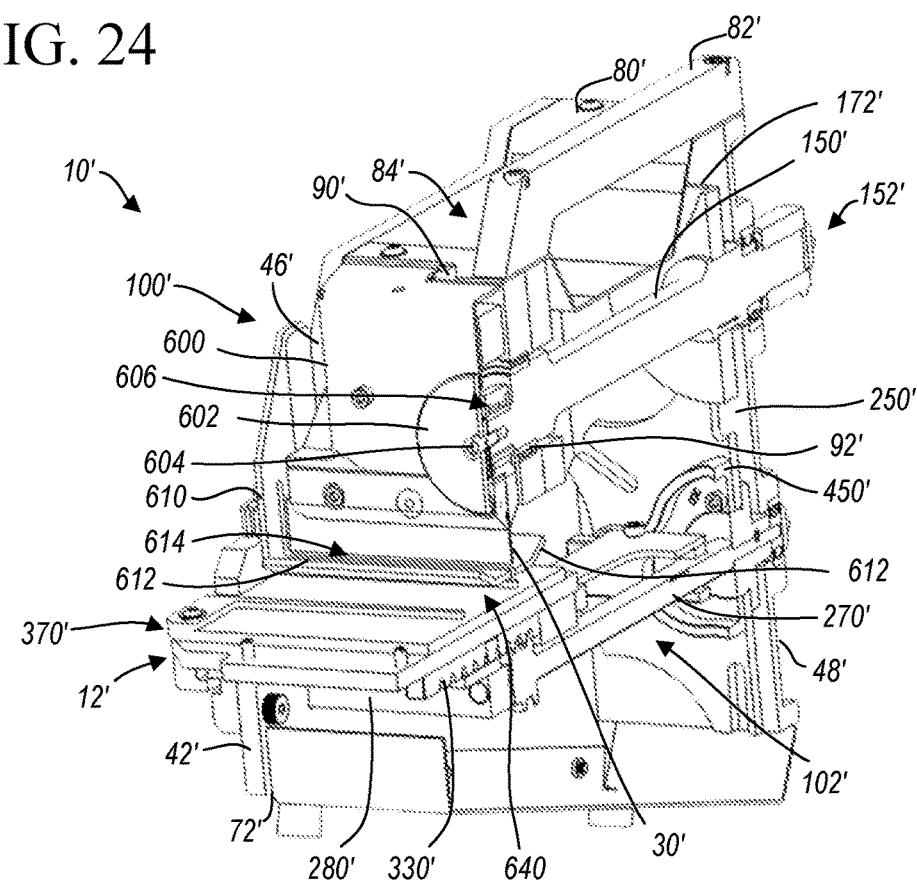
FIG. 25 is a perspective cross-section view along the line B-B of FIG. 24 showing the cutting assembly and the shifting assembly.
Figure 26:
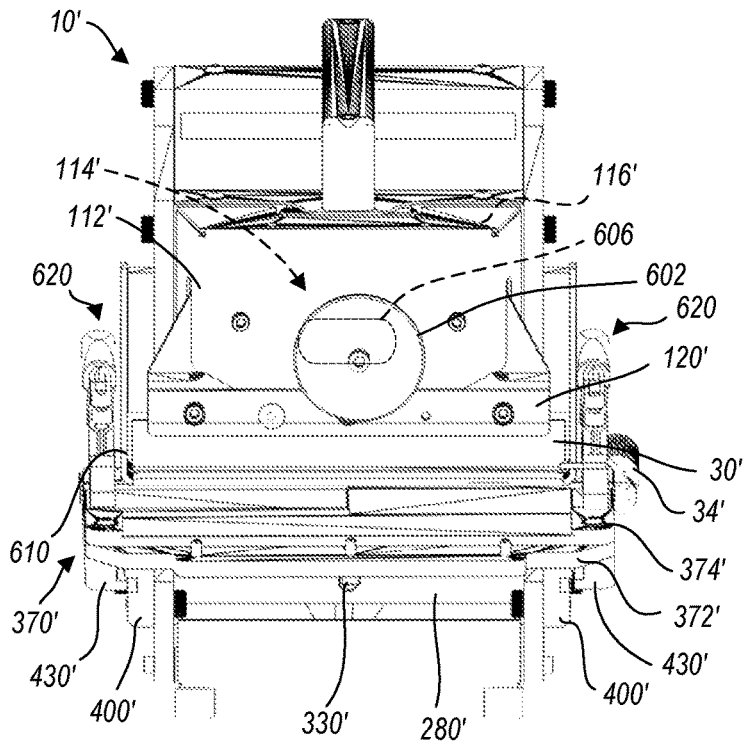
FIG. 26 is a front elevation view of the belt punch with a cam housing and rotatable cover shown in partial transparency for clarity.

As shown in FIGS. 24-26, the belt punch 10' includes a cam housing 600 that is disposed to cover at least a portion of the cutting assembly 100'. More particularly, the cam housing 600 is disposed to cover at least a portion of the blade holder 112' and the bearing 190' as the bearing 190' moves through the cam region 114' of the blade holder 112'. The belt punch 10' furthers includes a small movable shield or cover 602 that is fixed to the primary shaft 150' to rotate with the primary shaft 150'. For example, a fastener 604 may secure the movable cover 602 to the eccentric cam drive projection 180' of the primary shaft 150'. The fastener 604 extends through an opening 606 of the cam housing 600 and is secured to the primary shaft 150' to rotate with the primary shaft 150' relative to the cam housing 600. The movable cover 602 is sized such that the opening 606 in the cam housing 600 is covered by the movable cover 602 as the primary shaft 150' rotates the eccentric cam drive projection 180'. In this way, components of the cutting assembly 100' such as blade holder 112', the inner cam surface 118' of the cam region 114', primary shaft 150', cutter drive portion 196', bearing 190', bearing block 90', and/or roller bearings 116' are shielded from contamination that may hinder degrade operation of the cutting assembly 100'.

The belt punch 10' further includes a belt stripping member 610 that is secured to the frame assembly 40'. The belt stripping member 610 is secured to the frame assembly 40' so that spaced portions 612 thereof generally extend below the blade 30' when it is in a raised position. The spaced portions 612 are spaced from each other so that they form an elongate slot 614 therebetween. The elongate slot 614 has a length that is sized to permit the blade 30' to pass through the elongate slot 614 as cutting assembly 100' reciprocates the blade 30'. The spaced portions 612 are disposed on opposite sides of the blade 30' and strip the belt from the blade 30' as the blade 30' moves from a lower, cutting position upwardly out of the belt as it is common for the belt to stick to the blade 30'. The spaced portions 612 transition to upturned end mounting portions of the belt stripping member 610. The end portions are releasably secured to respective first and second side walls 42', 44' of the frame assembly 40'. The belt stripping member 610 may reduce installation time and complexity as compared to multiple-component belt strippers.

Figure 27:
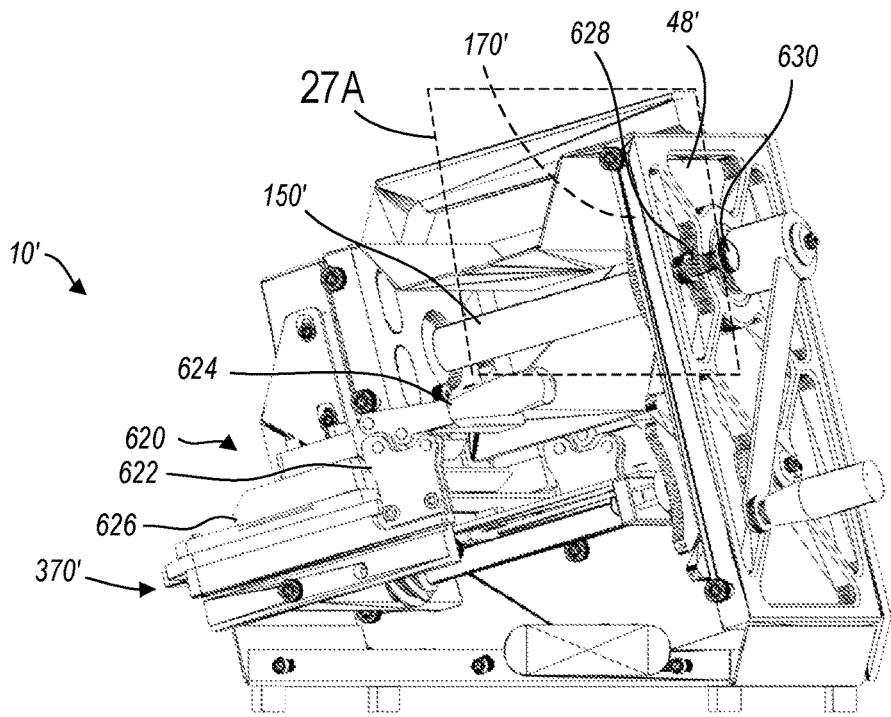
FIG. 27 is a rear perspective view of the belt punch with a side wall omitted for clarity and showing a rotation lock.

Referring to FIGS. 26 and 27, the belt punch 10' includes two table translation members 430' for engaging respective pivot and translation guides 400'. The pivot and translation guides 400' and table translation members 430' cooperate to maintain the table assembly 370' in downward engagement with the pivotable table support as the table assembly is translated relative to the frame assembly 40' by the rack 330' in a similar manner as discussed with respect to table translation member 430' above. The use of two table translation members 430' as opposed to a single translation member may provide more robust guidance during translation of the table assembly 310'.

The belt punch 10' further includes one or more clamps 620 for securing a belt to the table 12' during operation of the belt punch 10'. The clamps 620 are located at opposite ends of the blade 30' such that the blade 30' reciprocates between the clamps 620. For example, the clamps 620 may be located outside of opposing ends of the belt stripping member 610, and may be positioned at peripheral edges of the punch pad 374'. The clamps 620 may be toggle clamps or over-center clamps. As illustrated, the clamps 620 include a base 622, and a handle 624 that is pivotably connected to the base 622, and a clamping portion 626 that is pivotably connected to the base 622 and the handle 624. Actuation of the handle 624 moves the clamping portion 626 relative to the table 12'. During mounting of a belt on the table 12' for a cutting operation, the clamping portions 626 of the clamps 620 may be moved away from the table 12' to permit the belt to be slid under the clamping portions 626 on the table 12'. The handles 624 are then pivoted such that the belt is pressed tightly down onto the table 12' by the clamping portions 626 to be clamped between the clamping portions 626 and the table 12'.

Figure 27A:
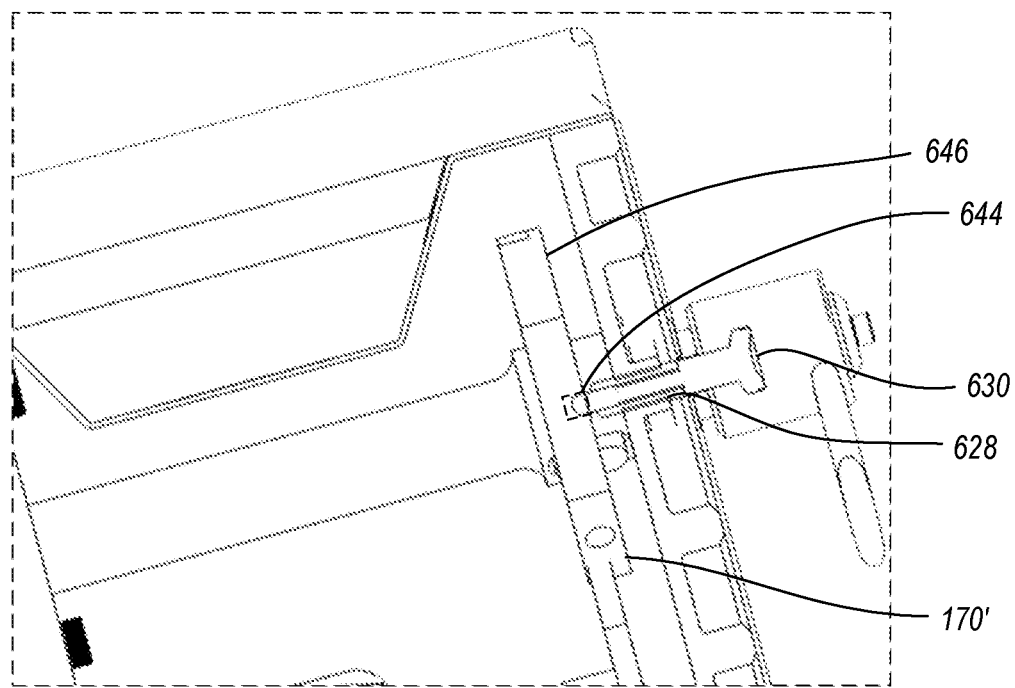
FIG. 27A is a detailed view of the rotation lock of FIG. 27 showing the rotation lock in a locked position.
Figure 27B:
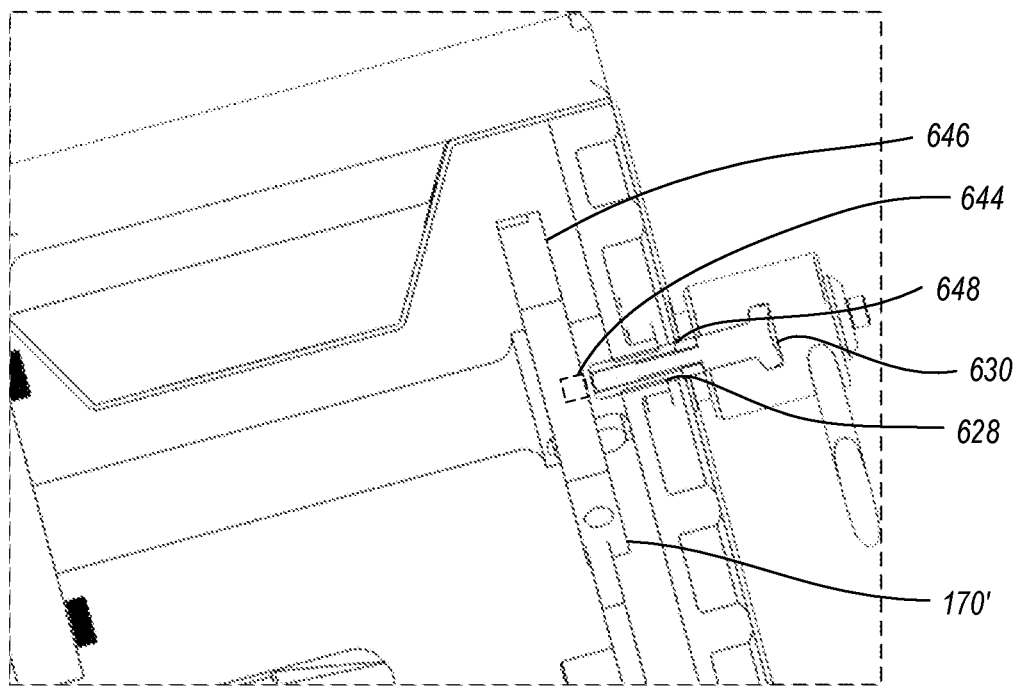
FIG. 27B is a detailed view of the rotation lock of FIG. 27 showing the rotation lock in an unlocked position.
Figure 27C:
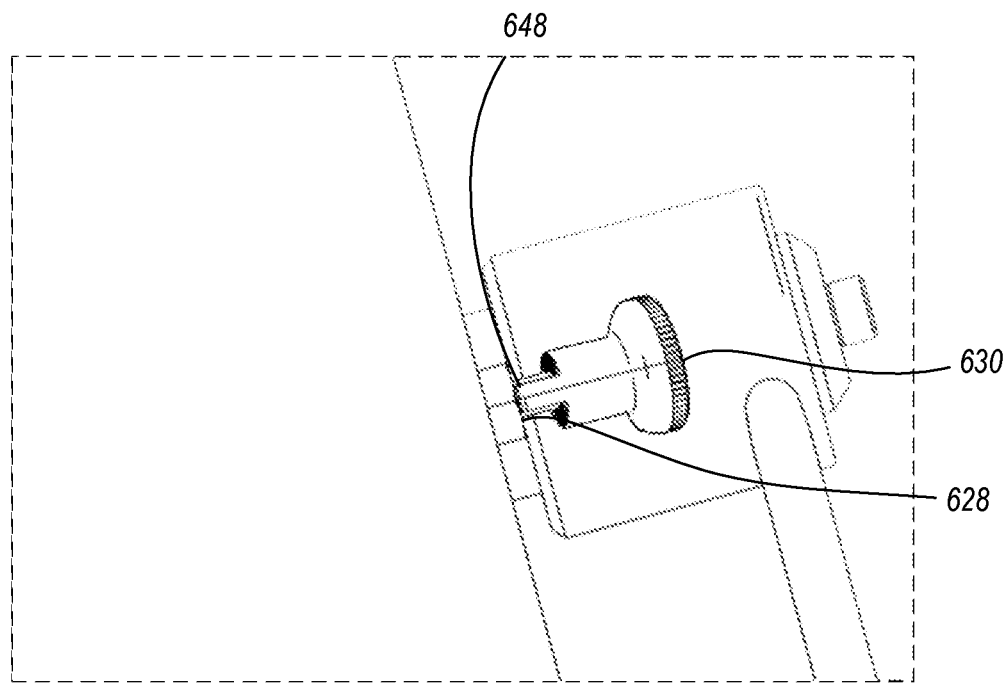
FIG. 27C is a detailed view of the rotation lock of FIG. 27 showing a stop surface of the rotation lock engaged with the rear wall of the housing to maintain the rotation lock in the unlocked position.

Referring to FIG. 27, the belt punch 10' may include a rotation lock 630 such as a pin or a bolt for inhibiting rotation of the primary shaft 150'. The rotation lock 630 extends through an aperture 628 in the rear wall 48'. Referring to FIG. 27A, in a locked position, the rotation lock 630 extends through the rear wall 48' a sufficient distance to engage the drive wheel 170'. For example, the rotation lock 630 may be received in an aperture 644 at a rear surface 646 of the drive wheel 170' such that rotation of the drive wheel 170' is inhibited by the rotation lock 630. As the primary shaft 150' is rotatably keyed to the drive wheel 170' locking of the drive wheel 170' also inhibits rotation of the primary shaft 150'. As such, in this locked configuration, the blade 30' is fixed to inhibit unintended reciprocation of the blade 30'. Referring to FIG. 27B, to unlock the blade 30', the rotation lock 630 is moved from the locked position to an unlocked position such that the rotation lock 630 is disengaged from the drive wheel 170'. In one approach, the rotation lock 630 is biased (e.g., spring biased) by a biasing member toward the locked position. Referring to FIG. 27C, to maintain the rotation lock 630 in the unlocked position, the rotation lock 630 may be rotated such that a stop surface 648 of the rotation lock 630 engages a portion of the rear wall 48' and keep the rotation lock 630 from moving toward the locked position. The engagement of the stop surface 648 against the stop surface 648 maintains the rotation lock 630 in the unlocked position against the biasing force of the biasing member.

Figure 28:
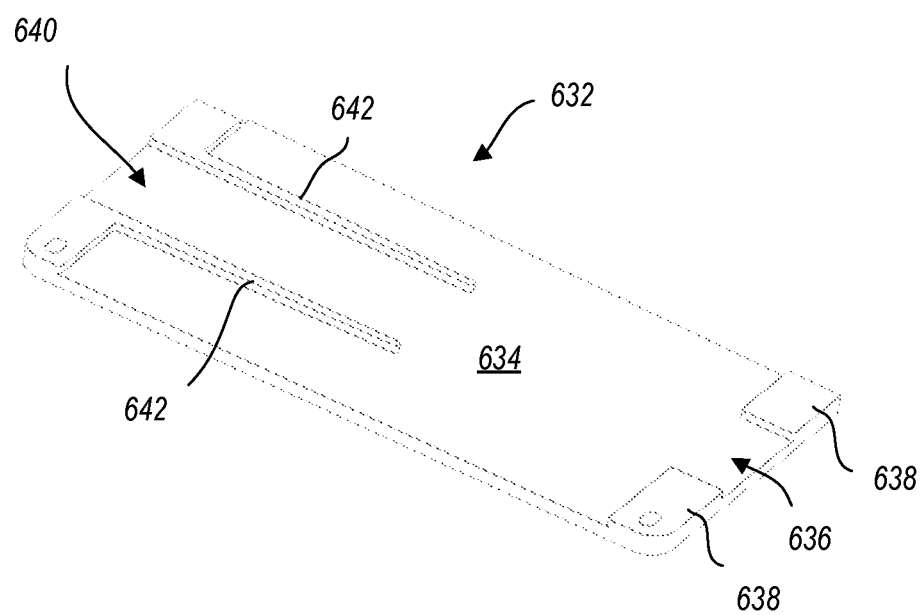
FIG. 28 is a perspective view of the punch pad showing a belt guide.

Referring to FIG. 28, the belt punch 10' includes a punch pad 632, which may be overlaid on, and fixedly secured to, a pad support member (e.g., the pad support member 372 previously discussed). The punch pad 632 may be of a resilient or pliable material such as nylon so that it does not damage or cause undue blade wear when a blade 30' is driven downwardly through a belt and into engagement with an upper cutting surface 634 of the punch pad 632. The punch pad 632 may include one or more channels for maintaining alignment of a belt before, during, and after cutting operations. For example, first opposing raised portions 638 are spaced from each other to cooperate to form a first channel 636 therebetween, and second opposing raised portions 642 are spaced from each other to cooperate to form a second channel 640 therebetween. The first and second channels 636, 640 are generally aligned to receive portions of a belt within the first and second channels 636, 640.

As illustrated, the second opposing raised portions 642 extend along the cutting surface 634 a greater distance than the first opposing portions 638 such that the second channel 640 has a greater length across the cutting surface 634 than the first channel 636. As shown, the raised portions 638 can have a square configuration at one end of the pad 632, and the raised portions 642 have an elongate, bar-like configuration extending from adjacent the other end of the pad 632 toward the end of the pad 632 including the square, raised portions 638. In still another approach, the first and second channels can be of equal in length. In other approaches, the punch pad 632 includes a single channel that extends along the entire length of the cutting surface 634 or less than the entire length of the cutting surface 634.

Figure 29:
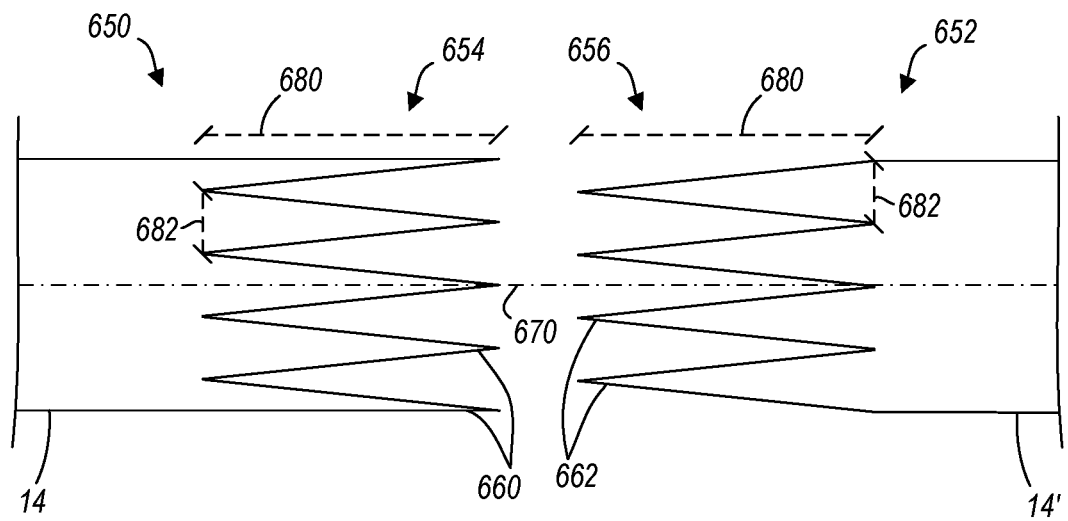
FIG. 29 is a top plan view of separated, opposing belt ends formed by the belt punch.
Figure 30:
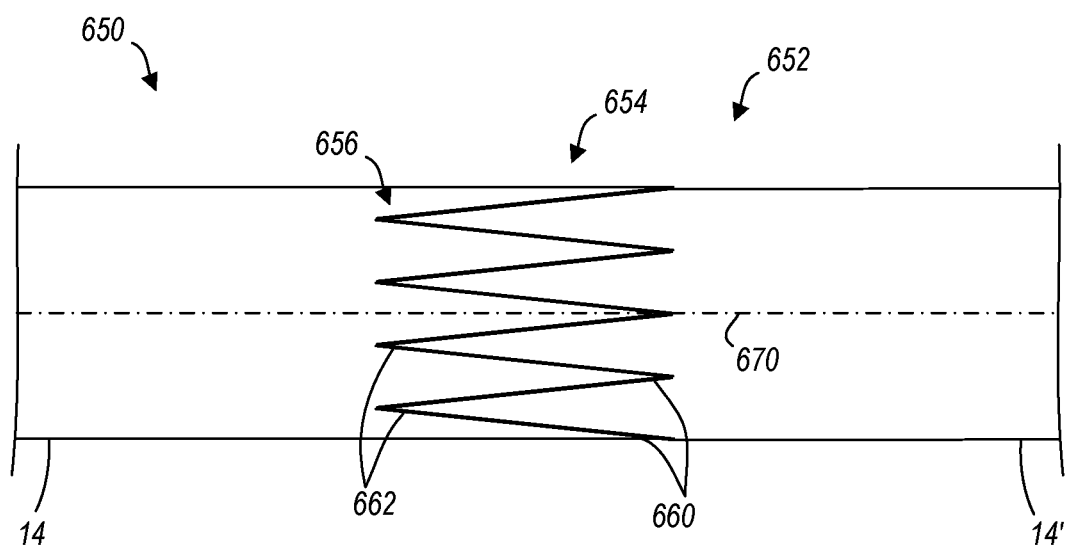
FIG. 30 is a top plan view of intermeshed belt ends formed by the belt punch.

Referring to FIGS. 29 and 30, the apparatuses and methods described herein may form belt ends 650, 652 of one or more belts 14, 14'. The formed belt ends 650, 652 include finger arrays 654, 656 having individual fingers 660, 662. Each finger 660, 662 may include cut side finger walls that extend, for example, +/−three degrees relative to a central axis 670 of the belt ends 650, 652. The fingers 660, 662 have a longitudinal dimension, indicated at 680, and a lateral base dimension at their widest point, indicated at 682. The longitudinal dimension 680 and lateral base dimension 682 may have a ratio, for example, of approximately 15-1 or 20-1. In one example, the longitudinal dimension 680 may be approximately 200 millimeters, and the lateral base dimension 682 may be approximately 10 millimeters, or approximately 12 millimeters (to account for the locating ridge 24). The elongated longitudinal dimension provides an increased side surface area of the fingers 660, 662 to improve the vulcanized splicing of the belt ends 650, 652. The elongated dimension also provides for increased overlap of belt reinforcements (e.g., fabric or cords) that extend within the belts. The overlap of the belt reinforcements facilitates transfer of forces to and from adjacent belt reinforcements through a matrix material (e.g., polyvinyl chloride, polyurethane, etc.) of the belt.

After forming the finger arrays 654, 656, the belt ends 650, 652 may be intermeshed such that the finger arrays 654, 656 form an interlocking engagement. The belt ends 650, 652 may be subsequently joined (e.g., welded) at the belt ends 650, 652 such that the belts 14, 14' form a unitary belt, which may form, or may be part of, a continuous belt.

While there have been illustrated and described particular embodiments of the present invention, those skilled in the art will recognize that a wide variety of modifications, alterations, and combinations can be made with respect to the above-described embodiments without departing from the scope of the invention, and that such modifications, alterations, and combinations are to be viewed as being within the ambit of the inventive concept.

What is claimed is:

1. A cutting apparatus for forming belt ends, the cutting apparatus comprising:
a table for supporting a belt;
a blade for cutting the belt; and
an actuator operably coupled to the table and the blade such that actuation of the actuator causes the blade to reciprocate and causes the table to shift relative to the blade,
wherein the actuator includes a user-actuated lever arm that is operably coupled to the blade for reciprocating the blade, and operably coupled to the table for shifting the table, and rotation of the lever arm in a first angular direction translates the table in a first direction, and rotation of the lever arm in a second angular direction opposite the first angular direction translates the table in a second direction opposite the first direction.

2. The cutting apparatus of claim 1 wherein actuation of the actuator is configured to continuously reciprocate the blade and to intermittently shift the table concurrently with reciprocation of the blade.

3. The cutting apparatus of claim 1 wherein the actuator is configured to translate and pivot the table relative to the blade.

4. The cutting apparatus of claim 1 wherein the lever arm is configured to shift the table as the lever arm rotates through a first range of rotary movement and does not shift the table as the lever arm rotates through a second range of rotary movement.

5. The cutting apparatus of claim 1 wherein the actuator is operably connected to a first rotatable shaft for reciprocating the blade and a second rotatable shaft for intermittently translating and pivoting the table relative to the blade.

6. The cutting apparatus of claim 5 further comprising:
a drive wheel rotatably fixed to the first rotatable shaft; and
a driven wheel rotatably fixed to the second rotatable shaft and intermittently rotated by the drive wheel during actuation of the actuator.

7. A cutting apparatus for forming fingers of a belt end, the cutting apparatus comprising:
a linear blade for cutting a belt;
a belt support opposite the linear blade for supporting the belt; and
a rotatable actuator configured to drive a drive transmission operably coupled to the linear blade and the belt support, wherein rotation of the rotatable actuator causes the drive transmission to
drive the linear blade to cut the belt to form a first side of a finger,
shift the belt support to reposition the belt relative to the linear blade, and
drive the linear blade to cut the belt to form a second side of the finger,
wherein the drive transmission is configured to translate and pivot the belt support from a first position for cutting the first side of the finger to a second position for cutting the second side of the finger.

8. A cutting apparatus for forming fingers of a belt end, the cutting apparatus comprising:
a linear blade for cutting a belt;
a belt support opposite the linear blade for supporting the belt; and
a rotatable actuator configured to drive a drive transmission operably coupled to the linear blade and the belt support, wherein rotation of the rotatable actuator causes the drive transmission to
drive the linear blade to cut the belt to form a first side of a finger,
shift the belt support to reposition the belt relative to the linear blade, and
drive the linear blade to cut the belt to form a second side of the finger, wherein the second side of the finger extends from the first side of the finger and forms an acute angle with the first side.

9. A cutting apparatus for forming fingers of a belt end, the cutting apparatus comprising:
a linear blade for cutting a belt;
a belt support opposite the linear blade for supporting the belt; and
a rotatable actuator configured to drive a drive transmission operably coupled to the linear blade and the belt support, wherein rotation of the rotatable actuator causes the drive transmission to
drive the linear blade to cut the belt to form a first side of a finger,
shift the belt support to reposition the belt relative to the linear blade, and
drive the linear blade to cut the belt to form a second side of the finger, wherein the drive transmission is configured to shift the belt relative to the linear blade such that the first and second sides cut by the linear blade form a generally triangular finger.

10. The cutting apparatus of claim 7 wherein the rotatable actuator is configured to intermittently shift the belt support along a shift axis, a cutting edge of the linear blade extending orthogonal to the shift axis.

11. The cutting apparatus of claim 7 wherein the linear blade is a single linear blade configured to cut the first side of the finger, and configured to cut the second side of the finger with the belt support shifted relative to the single linear blade.

12. A cutting apparatus for forming fingers of a belt end, the cutting apparatus comprising:
a table for supporting a belt;
a reciprocable blade for cutting the belt to form the fingers; and
an actuator operably coupled to the reciprocable blade and the table to intermittently translate and pivot the table to reposition the belt relative to the blade to allow the blade to cut the belt and form edges of the fingers,
wherein the actuator is a user-operated rotatable lever arm so that rotation of the rotatable lever arm by a user causes the table to both translate and pivot as the blade moves in clearance with the belt, and as the user continues to rotate the rotatable lever arm, the table stops translating and pivoting as the blade continues to move with the blade being in engagement with the belt.

13. The cutting apparatus of claim 12 further comprising a pivotable table support configured to cooperate with the table for pivoting the table and guiding translation of the table.

14. The cutting apparatus of claim 13 wherein the pivotable table support is pivotable relative to the blade and is fixed against translation.

15. A cutting apparatus for forming fingers of a belt end, the cutting apparatus comprising:
a table for supporting a belt;

a reciprocable blade for cutting the belt to form the fingers;

an actuator operably coupled to the table to intermittently translate and pivot the table to reposition the belt relative to the blade to allow the blade to cut the belt and form edges of the fingers; and a pivotable table support configured to cooperate with the table for pivoting the table and guiding translation of the table, wherein the pivotable table support includes a guide channel for receiving a guide member of the table, the guide member translatable relative to the pivotable table support and fixed against pivoting within the guide channel such that the table pivots with the pivotable table support.

16. The cutting apparatus of claim 15 wherein the guide member includes an elongate rack having teeth that form valleys therebetween, and a threaded shaft operably coupled to the actuator and engaged with the teeth, wherein actuation of the actuator rotates the threaded shaft to translate the guide member.

17. A cutting apparatus for forming fingers of a belt end, the cutting apparatus comprising:

a table for supporting a belt;

a reciprocable blade for cutting the belt to form the fingers;

an actuator operably coupled to the table to intermittently translate and pivot the table to reposition the belt relative to the blade to allow the blade to cut the belt and form edges of the fingers; and a pivotable table support configured to cooperate with the table for pivoting the table and guiding translation of the table, wherein the pivotable table support includes a guide channel for receiving a guide member of the table, the guide member translatable relative to the pivotable table support and fixed against pivoting within the guide channel such that the table pivots with the pivotable table support, wherein the guide member includes an elongate rack having teeth that form valleys therebetween, and further comprising, a threaded shaft operably coupled to the actuator and engaged with the teeth, wherein actuation of the actuator rotates the threaded shaft to translate the guide member, and wherein the teeth of the elongate rack include opposite non-coplanar walls for engaging the threaded shaft during rotation thereof such that as the pivotable table support is pivoted relative to the threaded shaft, rotation of the threaded shaft continues to cause the table to translate.

\* \* \* \* \*